Aug. 4, 1970 D. H. SHEPARD ET AL 3,523,280
APPARATUS FOR READING INTELLIGENCE BEARING CHARACTERS
Filed March 25, 1964 18 Sheets-Sheet 1

INVENTORS
David H. Shepard, Clyde C. Heasly, Pickard F. Bargh, and
Howard W. Silsby III
BY Mason, Fenwick & Lawrence
ATTORNEY Aug. 4, 1970 D. H. SHEPARD ET AL 3,523,280

APPARATUS FOR READING INTELLIGENCE BEARING CHARACTERS

Filed March 25, 1964 18 Sheets-Sheet 3

Aug. 4, 1970    D. H. SHEPARD ET AL    3,523,280
APPARATUS FOR READING INTELLIGENCE BEARING CHARACTERS
Filed March 25, 1964    18 Sheets-Sheet 5

Aug. 4, 1970 D. H. SHEPARD ET AL 3,523,280

APPARATUS FOR READING INTELLIGENCE BEARING CHARACTERS

Filed March 25, 1964 18 Sheets-Sheet 6

| | 0 | 1 | 2 | 3 | 4 | 5 | 6 | 7 | 8 | 9 |
|---|---|---|---|---|---|---|---|---|---|---|
| LVL | | + | + | − | + | − | + | + | | + |
| 2LVL | + | − | − | | − | | − | − | | − |
| US | + | − | − | − | + | + | + | − | + | + |
| UJ | + | − | + | + | − | − | − | + | + | + |
| LS | − | − | + | + | + | − | | − | + | − |
| LJ | − | − | − | + | + | + | + | − | + | + |
| UH | + | − | + | + | − | + | | + | + | + |
| SAJ | − | − | − | − | + | − | − | − | + | − |
Fig 15
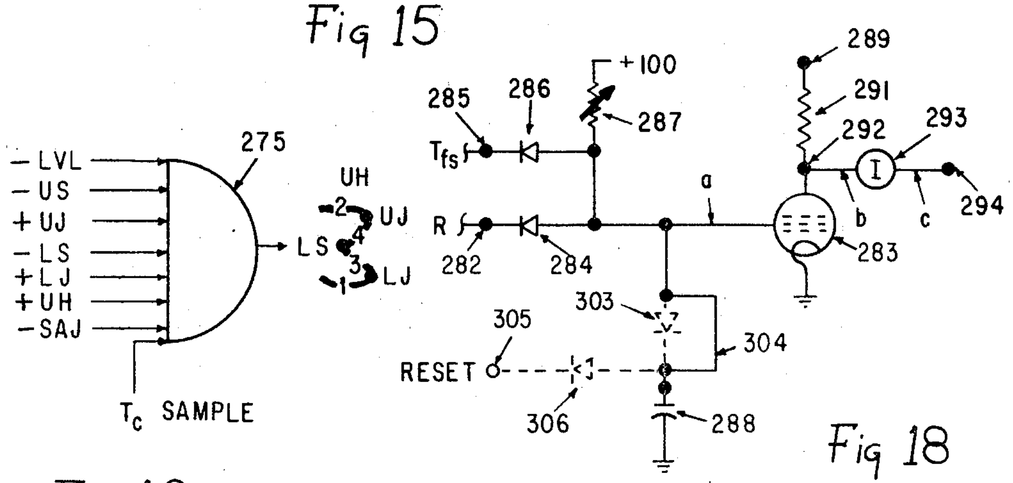
Fig 16, Fig 18
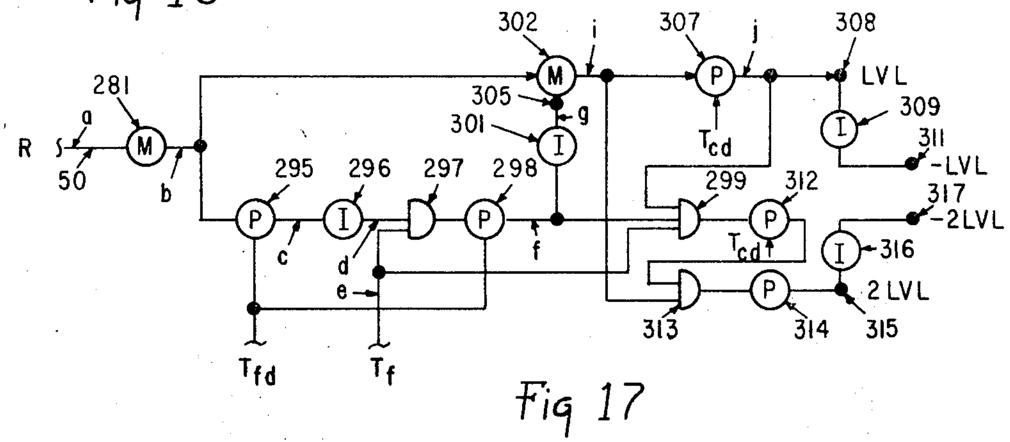
Fig 17

Aug. 4, 1970 D. H. SHEPARD ET AL 3,523,280

APPARATUS FOR READING INTELLIGENCE BEARING CHARACTERS

Filed March 25, 1964 18 Sheets-Sheet 13

Aug. 4, 1970 D. H. SHEPARD ET AL 3,523,280

APPARATUS FOR READING INTELLIGENCE BEARING CHARACTERS

Filed March 25, 1964 18 Sheets-Sheet 16

United States Patent Office 3,523,280
Patented Aug. 4, 1970

3,523,280
APPARATUS FOR READING INTELLIGENCE BEARING CHARACTERS

David H. Shepard, Rye, N.Y., and Clyde C. Heasly, Jr., Arlington County, Howard W. Silsby, 3d, Annandale, and Pickard F. Bargh, Alexandria, Va., assignors to Farrington Electronics, Inc., Springfield, Va., a corporation of Massachusetts Filed Mar. 25, 1964, Ser. No. 355,149
Int. Cl. G06k *9/12, 9/13*
U.S. Cl. 340—146.3 10 Claims The present invention relates in general to methods and apparatus for interpreting signals derived from scanning of intelligence-bearing items and activating selected ones of a variety of output devices in accordance with decisions made on the basis of selective information sensed from the items.

Briefly, the invention relates to automatic interpretation of signals from scanning items of information such as printed characters, handwritten characters or any type of intelligence-bearing items by following the various streams or strokes of the intelligence-bearing items and detecting by utilization of the signals the presence and/or absence of preselected patterns to recognize the items and present the recognition decision to an output device for recording and reproducing the intelligence-bearing item recognized. The following of the various streams or strokes of the intelligence-bearing items is accomplished by comparing on a time basis the recorded events occurring during a past scanning frame with those events occurring during successive scanning frame intervals. By comparing time based events of past and present scanning frames it has been found that the various streams or strokes may be reidentified during each successive scanning frame to be followed to their natural end, during the course of which suitable logic circuitry has been developed to determine only certain preselected patterns unique within the intelligence-bearing items being scanned such as horizontal lines, slanted lines, vertical lines, joinings of the strokes or streams, splittings of the strokes or streams, etc., and to further determine within which stream or stroke, the preselected patterns are observed and as well as the relative positions of the streams or strokes within the intelligence-bearing item being scanned. Various combinations or permutations of occurrences and/or non-occurrences of such preselected patterns and/or their positioning within the character are selected, each set of such selected criterion to be peculiar to only one intelligence-bearing item in any group being scanned for identification purposes.

An object of the present invention is the provision of novel methods and apparatus for interpreting signals produced from scanning intelligence-bearing items, and by selected predetermined characteristics identifying each of the intelligence-bearing items in accordance with its representative yet distinct combinations or permutations of pattern characteristics which have been recognized from the scanned signals.

Another object of the present invention is the provision of novel reading apparatus for sensing and interpreting intelligence-bearing items by following their various strokes or streams to their natural ends and detecting certain selected predetermined intracharacter patterns by relating the various strokes or streams within the item for recognizing the intelligence-bearing item.

A further object of the present invention is to provide novel reading apparatus for distinguishing intelligence-bearing items from unique patterns of portions thereof and reproducing the same, which is adapted to be selectively programmed to recognize a wide variety of intelligence-bearing items.

Another object of the present invention is the provision of novel reading apparatus for sensing and interpreting intelligence-bearing items upon following their various strokes or streams to their natural ends by comparing previous scanned item events with current scan item events, and by utilization of the latter, detecting certain selected predetermined patterns for recognizing and reproducing the intelligence-bearing items.

A further object of the present invention is the provision of novel reading apparatus for sensing and interpreting signals produced from scanning intelligence-bearing items and by selected predetermined patterns, reproducing each of the intelligence-bearing items by having a programable interpreter apparatus adapted to recognize representative yet distinct combinations or permutations of patterns pertaining to the scanned items, which characteristics relate the various segments of an item to each other rather than to the scanning base and thus do not depend on alignment.

Other objects, advantages and capabilities of the present invention will become apparent from the following detailed description taken in conjunction with the accompanying drawing, showing only a preferred embodiment of the invention.

In the drawings:

FIG. 15 is a recognition table showing the necessary criteria for recognizing the various characters in one embodiment of the present invention;

FIG. 16 shows one of the sets of the recognition criteria in the present embodiment necessary to enable an output AND gate for identifying a character recognized;

FIG. 17 is a schematic diagram of the vertical stream detector unit;

FIG. 18 shows the measuring unit and special measuring unit circuitry;

GENERAL DESCRIPTION

Figure 1:
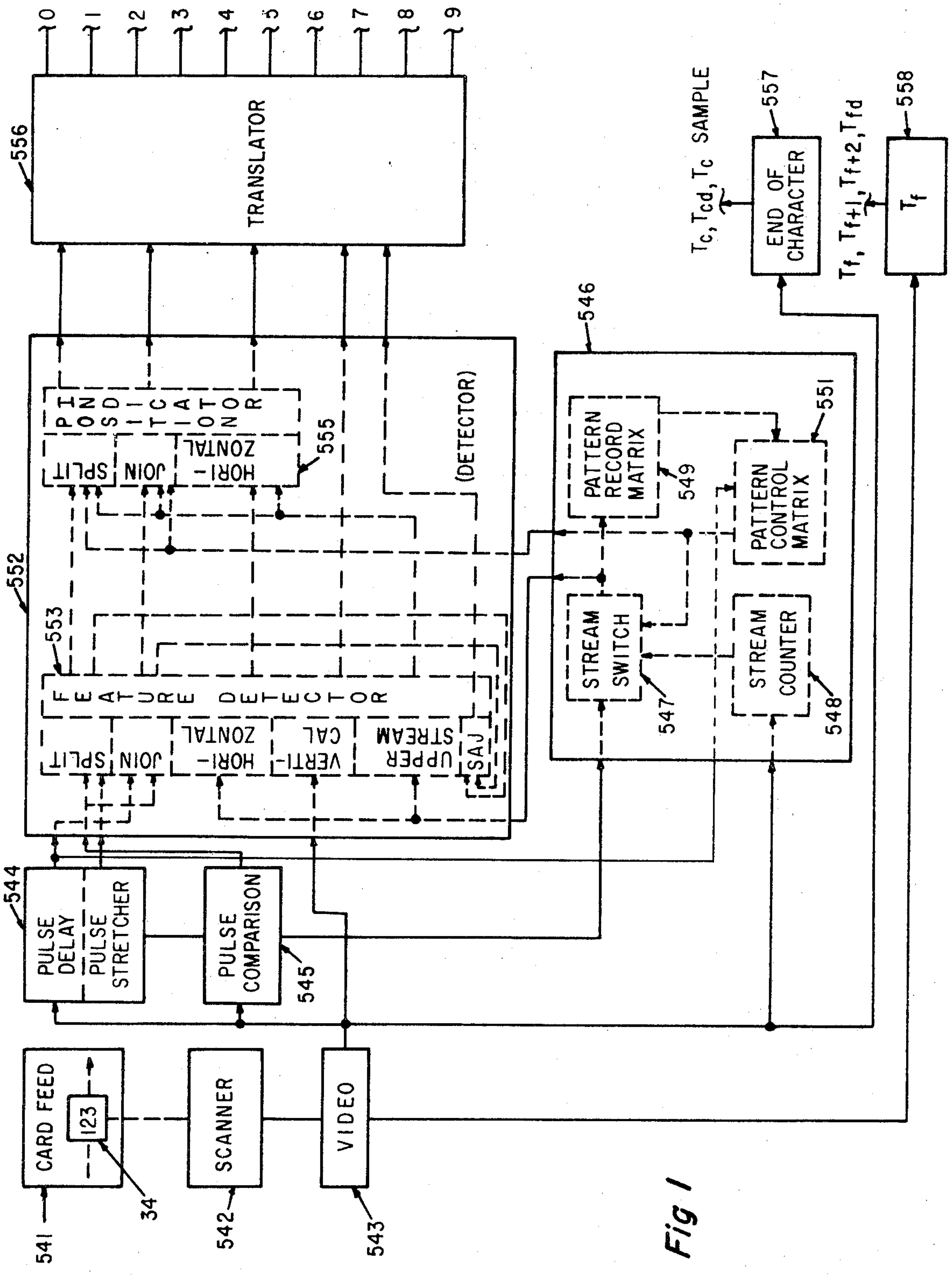
FIG. 1 is a block diagram of the present invention.

There is illustrated in FIG. 1 a functional block diagram of the present invention. This figure is intended, along with the following description, to serve as an introduction to the detailed description which is presented hereafter. It will be observed that the exact number of interconnections between the several units as well as the reset circuit connections are disclosed in detail in the description which follows:

Documents 34 bearing intelligence information in character form are adapted to be fed from a feed mechanism 541 which may be similar to those described in co-pending U.S. patent applications Ser. No. 208,432 filed July 9, 1962 by Howard W. Silsby et al., now Pat. No. 3,193,281 or Ser. No. 317,755 filed Oct. 21, 1963 by Walter Lee et al., now Pat No. 3,201,113. In the embodiment illustrated documents are fed one at a time past the scanner 542 where light is reflected from the surface of the moving document 34 to present at some focal point a moving image of the information which is progressively disected into elemental zones by a rotating mechanical slitted disk, appearing as discrete successive vertical slices of the information. The images are then converted into electrical signals by a photomultiplier tube in the video circuitry 543 producing signals which are a function of the intensity of the light energy received. The signals are amplified, clipped and then set to a controlled level thus providing a two level output signal denoting the presence or absence of a character portion, commonly termed "recognition" or "non-recognition."

The recognition signal events during each scan frame are delayed for slightly less than one frame period and then stretched in the block unit 544. These signal events are then recalled for comparison with signal events of the next scan in unit 545. By such a comparison old streams or strokes of the character may be followed from scan frame to scan frame until the character ends, and new streams or strokes of the character may be recognized.

The comparison signal from unit 545 is then coupled to a stream routing unit 546 consisting of in the preferred embodiment a stream switching unit 547, a stream counter 548, a pattern record matrix 549 and a pattern control matrix 551, whereby newly observed streams are numbered in stream counter 548 and recorded along with old streams, according to the sequence in which the streams are recognized, in the pattern record matrix 549. This information is forwarded to the pattern control matrix 551 for controlling the switch circuity in stream switch unit 547 to regulate the actual orderly occurrence of the prenumbered streams as they are recognized during each successive scanning frame. The aforesaid developed signals are then applied to a detector 552 for producing pattern criteria for character recognition, comprising in the preferred embodiment a feature detector 553 and a position indicator unit 555 wherein the stream following is monitored to the extent that at least such patterns as streams splits, stream joins, vertical streams splitting after joins, and horizontal streams, may be detected in any one character being scanned. The splits and joins are associated with the streams in which they occur, and then the pattern of stream splits, joins and horizontals are observed by position indicator unit 555 so as to determine in which portion (lower or upper) of the character they occur so as to be located. The output of the recognition and criteria logic is then coupled to a series of output AND gates in the translator unit 556 which emits a signal representative of the recognized scanned character. From the video unit 543 signals are coupled to an end-of-character unit 557 determining the end of the character being scanned for developing reset and sampling signals $T_f$, $T_{f+1}$, $T_{f+2}$, and $T_{fd}$ and a $T_f$ unit 558 determining the end of each scanning frame for developing reset and sampling signals $T_f$, $T_{f+1}$, $T_{f+2}$, and $T_{fd}$, whereby the aforesaid end-of-character and end-of-scanning-frame signals are employed throughout the logic heretofore described as will be shown in more detail hereinafter.

SCANNING APPARATUS

Figures 2, 2A:
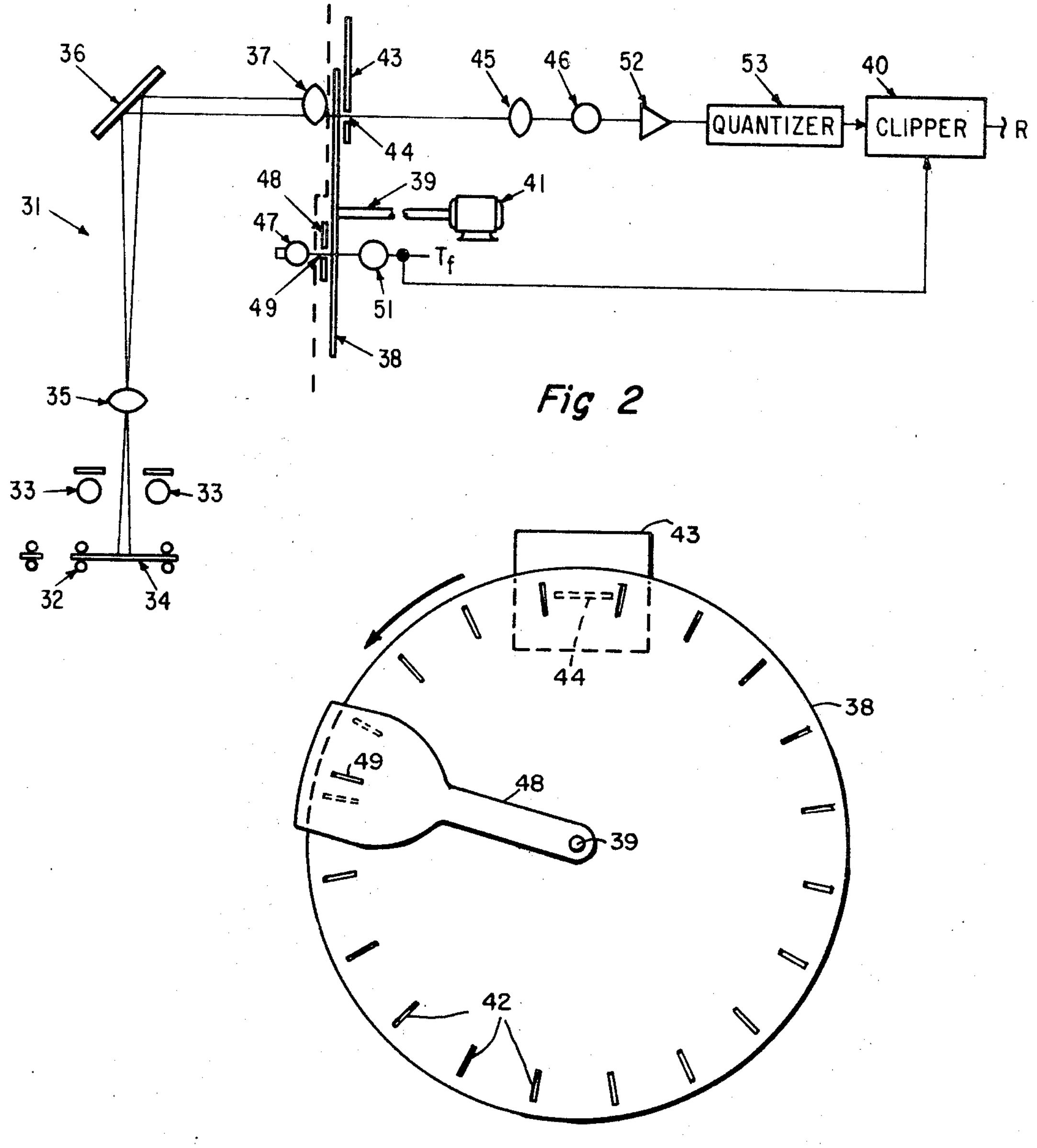
FIG. 2 is an optical schematic diagram of the optical scanning components of one form of scanning apparatus with which the present invention may be used.
FIG. 2A is an elevational view of the scanning disk in the scanning unit illustrated in FIG. 1, viewed from the line 2—2 of FIG. 1.

An exemplary scanning assembly, which is one of several forms that could be used with the apparatus herein, is shown in FIG. 2 and corresponds fundamentally to that disclosed in U.S. Pat. No. 2,978,590 granted to D. H. Shepard. This scanning assembly, generally indicated by the reference character 31, is mounted directly over feed track 32 of a suitable automatic document feed mechanism so that the optical center axis of scanning unit 31 is perpendicular to the plane of the feed track with the optical center axis lying in the center of the scan zone from which information is to be read. The reading area is brightly illuminated by a pair of lamps 33.

Light reflected from the document 34, is focused by a focusing lens 35 and is bent through an angle of 90 degrees by a first surface mirror 36, and thence through a correcting lens 37 to focus the image of the document on the plane of the scanning disc 38. The scanning disk is provided with a central shaft 39 rigidly affixed thereto which is supported for rotation and driven at a high speed by synchronous motor 41 interconnected thereto in any conventional manner. As will be apparent from FIG. 3, the scanning disk 38 is provided with a number of equally spaced radial slits 42 disposed near the periphery of the disk. In a preferred embodiment, the scanning disk is a 7.5 inch diameter aluminum disk containing twenty 0.010 inch wide radial slits 42 spaced at equal intervals of approximately 18 degrees. The portion of the image which passes through the radial slits 42 in the scanning disk 38 falls upon a fixed plate 43 having a fixed slit 44 therein which is slightly shorter in length than the spacing between successive radial slits 42 of the scanning disk 38. The beam transmitted by the fixed slit 44 is directed by an optical loop 45 onto the photocathode of a photomultiplier tube 46 to form an electrical signal conventionally designated as R, indicative of the image being scanned.

In operation of the scanning unit 31, light from the illuminating lamps 33 is reflected from the surface of the document 34 as the document passes the reading station. As the image of the document at the reading station is focused on the plane of the scanning disk 38 in the path of the scanning disk radial slits 42, passage of a radial slit 42 through the image allows a thin slice of the image to fall upon the fixed plate 43. This thin slice travels across an elemental zone of the image, allowing a changing portion of the image to fall upon the fixed plate 43 as disk 38 rotates. The portion of the radial image which intersects the fixed slit 44 is directed on to the photocathode of the photomultiplier 46. In the preferred embodiment approximately 25–30 scans may occur as one character passes the reading station.

Since the length of the fixed slit 44 is slightly less than the distance between successive slits, there is an interval after the completion of one scan and prior to the beginning of the next scan when no light passes through the scanning disk 38. This interval is called the "dark time" and the pulse which it causes is called the "black pulse."

Provision is also made in the scanning unit 31 for providing timing signals, designated $T_f$, which identify the end of each scanning frame. For this purpose, a suitable exciter lamp 47 is mounted in front of the scanning disk 38 on an adjustable radial bracket 48 which is journalled at its inner end about the shaft 39. The $T_f$ mounting bracket 48 extends radially from the shaft 39 to a position beyond the periphery of the scanning disk 38 and is provided with a radial slit 49 which is in registry with the path of the radial slits 42 of the scanning disk 38 to allow a narrow radial beam of light emitted from the exciter lamp 47 to pass through the slit 49 onto the scanning disk 38. A photocell 51 is mounted on or behind the mounting bracket 48 in alignment with the exciter lamp 47 and the radial slit 49 to thereby generate the timing signal $T_f$ in response to light excitation of its photocathode, each time one of the scanning disk slits 42 passes fixed slit 49. By supporting the exciter lamp 47 and the $T_f$ photocell 51 on the radial bracket 48 in which radial slit 49 is provided, the adjustment of these components, for determining the time relation of the timing pulse $T_f$ to the scanning of the document area so as to cause the $T_f$ pulse to be produced just before each radial slit 42 leaves the fixed slit 44, is exceedingly facilitated.

Whenever an un-inked portion of the document 34 is traversed by the scanning beam, a substantial portion of the light impinging upon the document will be reflected to the photocell 46 causing a relatively greater current flow through the photocell and its plate resistor and resulting in a certain voltage level at the photocell output related to the reflected light intensity. Whenever an inked portion of an image on the document 34 is similarly traversed by the scanning beam, a much lower light intensity will be reflected to photocell 46 producing a lower current flow and lower voltage drop in the photocell plate resistor, thus producing a photocell output voltage pulse of greater amplitude. Thus, the output from the plate of photocell 46 will be characterized by a certain potential representative of document background or white areas on which are entrained relatively positive pulses resulting from scanning inked portions. The photocell output pulse is coupled to an amplifier 52 which amplifies the intensity of the pulse to a usable value.

Coupled to the output of the amplifier 52 is a quantizer or voltage discriminator 53 such as that shown in U.S. Pat. No. 2,943,208 granted June 28, 1960 to D. H. Shepard et al., for producing an output signal only when the voltage of the pulse coupled thereto from amplifier 52 is above a critical threshold voltage which is arbitrarily set to correspond to a desired darkness or contrast level anticipated in the reading problem. The quantizer 53 therefore produces a constant voltage signal (recognition pulse) when a valid "hit" or inked area is detected by the photocell 46. The output of quantizer 53 is coupled to clipper circuitry 40 to selectively cut out at time $T_f$ the large positive "black pulses" occurring during the period between the moving scanning slits, the output from the clipper 40 being the recognition signal R.

The above-described scanning mechanism is one of many varied types with which the apparatus hereinafter described may be used.

STREAM IDENTIFICATION APPARATUS

Figure 3:
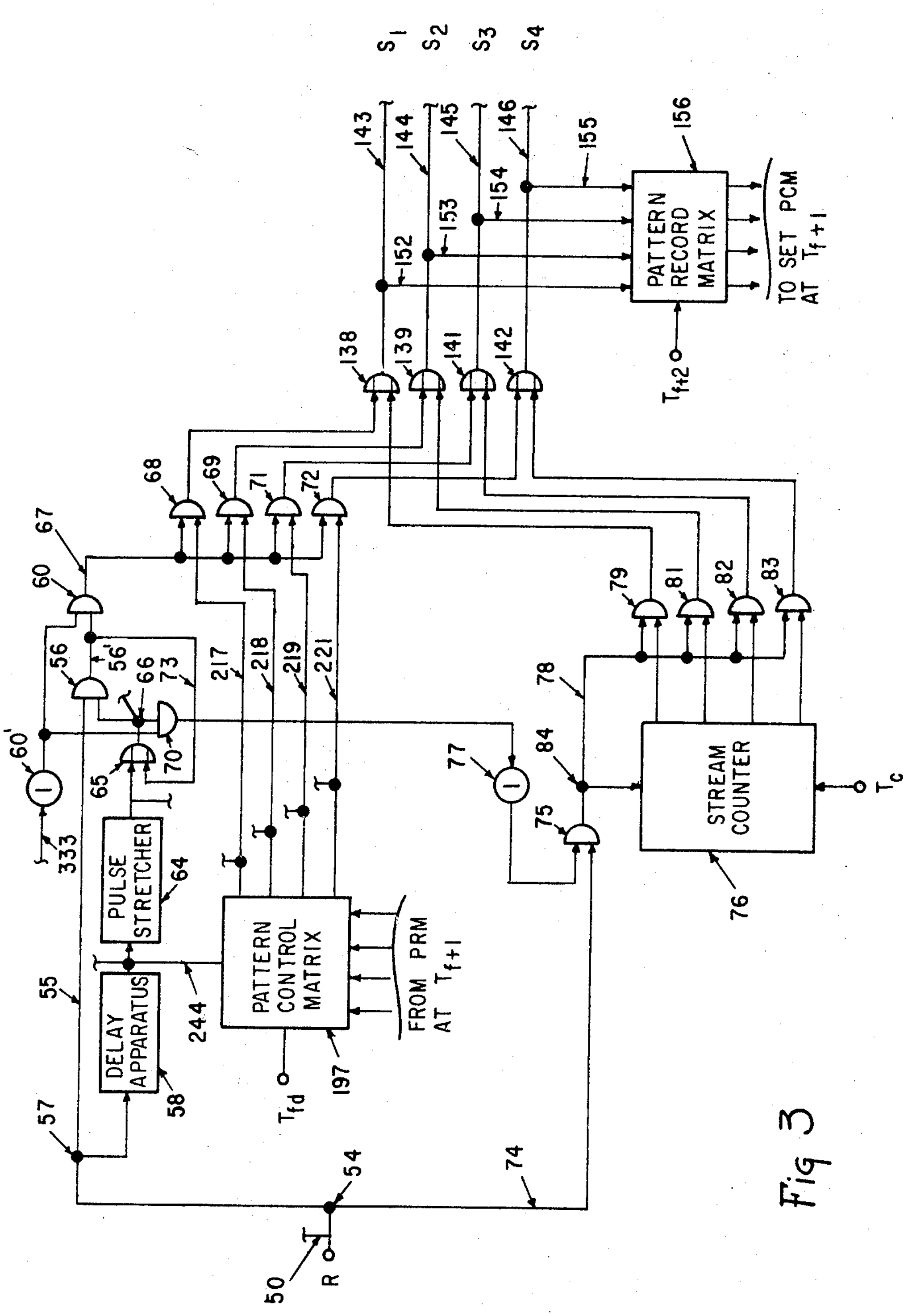
FIG. 3 represents a detailed schematic block diagram of the stream routing unit of the present invention.
Figure 4:
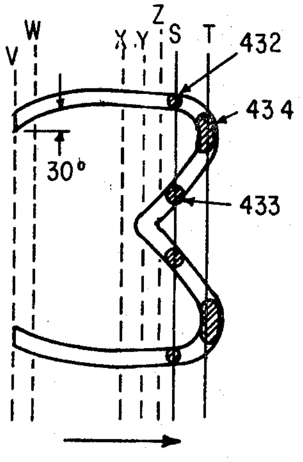
FIG. 4 illustrates, by way of example, the manner in which the stream or strokes of a character are followed to identify the character illustrated.
Figure 5:
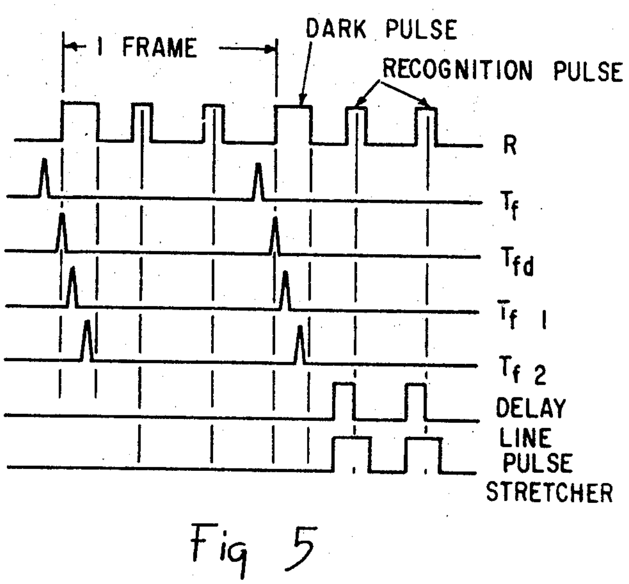
FIG. 5 shows a series of time-related voltage wave forms showing time variant voltages at the corresponding points indicated alongside the wave forms.
Figure 6:
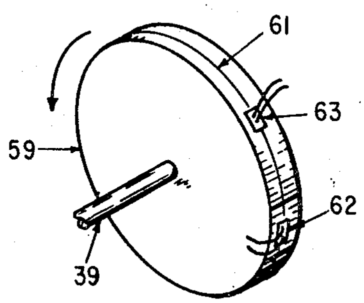
FIG. 6 illustrates one form of delay apparatus which may be employed in the present invention.

FIG. 3 illustrates schematically the stream routing unit of the present invention which provides a system for identifying the various streams of any one image to be read as the scanning progresses, wherein a scheme is effected for applying identification to the streams in some orderly manner and keeping the identification matched to the respective stream throughout the scanning of the whole item regardless of what occurs in other streams. The streams referred to herein are the stroke portions of any character to be read. For example, in reading the character 3 from left to right as viewed in FIG. 4, two streams are first encountered, formed by the horizontal strokes of the character projecting toward the left. By identifying each separate stream, the branchings (separations) and joining of the streams can be properly related. The recognition signal R, derived from a scan of the character 3 is shown in FIG. 4, which emerges from the clipper 40 is branched at point 54 to be applied via lead 55 to AND gate 56. The signal on lead 55 is branched at point 57 and fed to a delay means 58. The delay means may be a delay line, but in the specific embodiment herein illustrated is a magnetic drum 59, such as that shown in FIG. 6, rotating in synchronism with the scanner disk 38 and having a track 61 thereon, with write and read heads, 62 and 63 respectively, closely engaged therewith, the heads being spaced slightly less than 18 degrees about the periphery thereof. The radial slits 42 on scanning disk 38 are separated from each other about the scanning disk by an angle of 18 degrees, which distance is determinative of a frame period. Thus, even though the speed of rotation is an independent variable, the delay period is coordinated with the frame period, as the scanning disk 38 and magnetic drum 59 are rotating at the same speed about a common shaft 39. Thus, it can be seen that the output recognition pulse from delay means 58 will appear, as shown in FIG. 5, at a time of slightly less than one frame period later than the input recognition pulses applied thereto. Similarly, if one were to use a cathode ray tube as the scanning apparatus, then the frame period would be dependent on the frequency of the horizontal sweep generator.

The output signal from delay means 58 is then fed to the input of a conventional pulse stretcher 64 employed to elongate the delayed recognition pulse a sufficient time to account for the angular variations of the adjacent portions of the stroke being scanned. For instance, referring to FIG. 4, the signal derived from scan *v* will be delayed for slightly less than one frame period to be compared with the subsequent recognition pulse derived from the next scan which, in the instant case, is scan *w*. It is observed that scan *w* will intersect the top stroke of character 3 earlier than in the previous scan *v*. However, since the scan *v* signal was delayed slightly less than the frame period, a comparison may be made. Likewise, the pulse stretcher is employed to compare a subsequent scan intersect of an adjacent stroke portion of a character which may occur later in time relative to the prior scan intersect of the same stroke. The stretched output recognition pulse from the pulse stretcher 64 is then applied to OR gate 65 from whence a portion of the signal is fed via point 66 to AND gate 56. Coincidence of a recognition pulse during a scan period with a delayed recognition pulse from a prior scan period will enable AND gate 56 to conduct the output signal being fed to AND gate 60. AND gate 60 is also coupled from a signal source on lead 333 of the split feature detector (shown in FIG. 26) via inverter unit 60', so that when no split has been recognized, inverter unit 60' will be up to enable AND gate 60 to produce an output signal on lead 67 for each input signal on lead 55 and feed a validated recognition pulse to AND gates 68, 69, 71 and 72 simultaneously. Lead 56' is tapped by lead 73 to feed back a portion of the output signal from AND gate 56 to OR gate 65 for reasons as will hereinafter be described.

The recognition signal from clipper 40 is also routed from point 54 via lead 74 to be fed as an output signal into AND gate 75. At this point, it is assumed that the delay means 58 is empty and that the stream counter 76 has been reset by an end-of-character pulse, $T_c$, indicating that a character has been recognized, provisions being made for automatically initiating said pulse when the mechanism is turned on. Therefore, a "clear" pulse should have reset all character identification circuitry for recognizing the next character to appear. This "clear" pulse is developed in the character recognition circuitry, as will hereinafter be described. Since delay means 58 is empty, no signal will be applied to the input of AND gate 70 via OR gate 65 and, therefore, the output of inverter 77 will be positive so that the first recognition pulse to appear via lead 74 will make AND gate 75 conductive, producing an output recognition pulse on lead 78 to be fed to AND gates 79, 80, 81 and 83, simultaneously. Similarly when a split is recognized by the feature detector shown in FIG. 26, the output of invertor 60' will be negative, disabling AND gate 70 and allowing for a positive output at inverter 77. This conditions AND gate 75 to conduct when the lower portion of the split stream is recognized so that it may be counted as a new stream within the character being scanned. Lead 78 is branched at point 84 to also feed the recognition pulse to stream counter 76 where, in the instant embodiment, only a maximum of four streams (if present), are counted per any one of the characters disclosed in FIG. 46.

Stream counting unit

Figure 7:
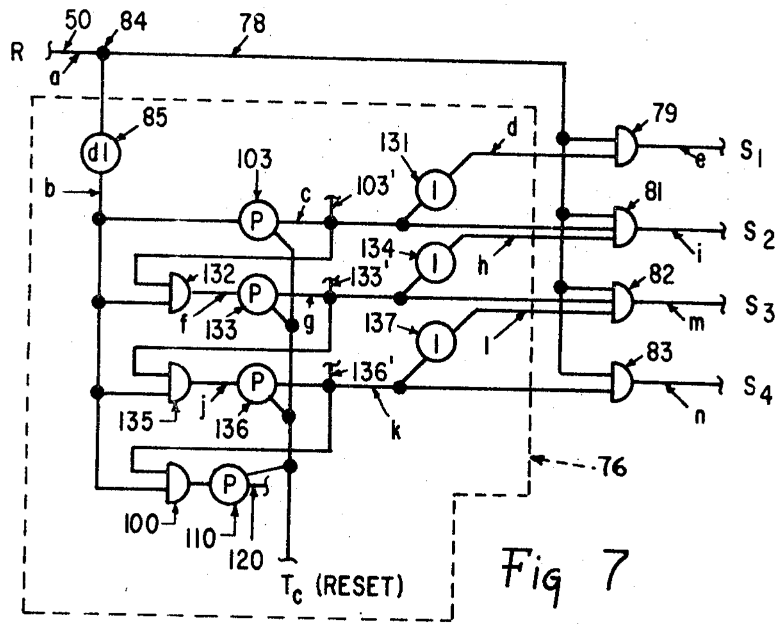
FIG. 7 shows the detailed schematic diagram of the stream counter unit.
Figure 8:
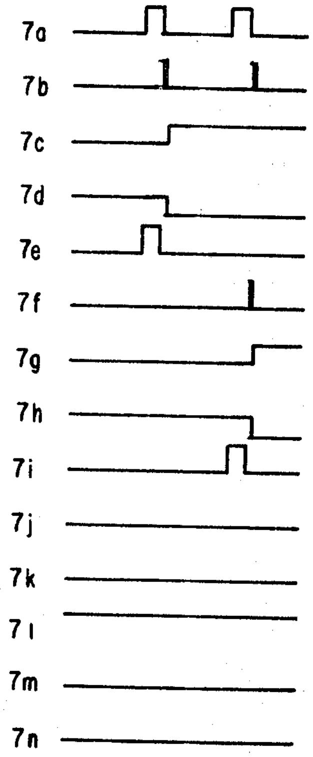
FIG. 8 illustrates a series of time-related voltage wave forms showing time variant voltages at the corresponding points indicated in the stream counter unit.
Figure 12:
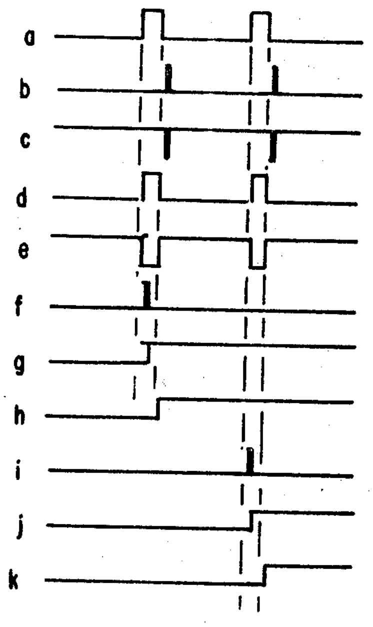
FIG. 12 illustrates a series of time-related voltage wave forms showing time variant voltages at the corresponding points indicated in the pattern record matrix unit.

Referring now to the stream counting unit 76 shown in FIG. 7, the first recognition pulse from a scanned character (see wave form *7a* of FIG. 8) to enter the stream counter 76 is fed through a differentiating inverter 85. The preferred embodiment of the differentiating inverter stage 85 is illustrated in schematic form in FIG. 9, wherein the input recognition pulse is fed to the grid of triode tube 86 via input terminal 87 and capacitor 88, the grid also being coupled to negative potential of —365 volts at terminal 89 through resistor 91 whereas, depending upon the output function to be performed, the grid is further coupled to either +15 volts or —25 volts at terminal 92 via resistor 93. Since it is desired in this instance, to form a positive differentiated pulse at the trailing edge (see wave form *7b*), of the recognition pulse appearing at the input terminal 87, a positive potential of +15 volts is applied to terminal 92. The plate of triode 86 is coupled to positive potential of 100 volts at terminal 94 through resistor 95, while the cathode is directly tied through registor 90 to a negative potential of 125 volts at terminal 96. The output terminal 97 is coupled to —25 volts at terminal 98 via diode 99, and also to +15 volts at terminal 101 via diode 102 to clip the output signal to either +15 volts or —25 volts, depending upon the output value. In operation, the +15 volts at terminal 92 will be applied to the grid causing current to flow, thereby lowering the potential on the plate of tube 86 to develop an output voltage of —25 volts at terminal 97 until interrupted by the recognition pulse from AND gate 75 appearing at terminal 87, at which time the trailing edge of the recognition pulse will momentarily cause a potential drop on the grid of tube 86 to cause a positive pulse of short time duration (see wave form *7b*) at the output terminal 97. The output pulse from differentiating inverter 85 is then fed to a primer 103 and to each of primer input AND gates 132, 135 and 100.

The primer 103 is a bistable unit used to produce a continuous output signal a very short time interval after the input is enabled, which output signal remains continuous regardless of the application of subsequent input signals, until the unit is reset as will hereinafter be disclosed. A preferred embodiment of the primer stage 103 is illustrated in schematic form in FIG. 10, wherein a pair of input terminals 104 of an AND gate are connected through diodes 105 to point 106 which is coupled via resistor 107 to a positive potential of 100 volts at terminal 108. This potential at terminal 108 is further coupled to each of the plates of triode tubes 109 and 111 via resistors 112 and 113 respectively. The signal at point 106 is applied to the grid of tube 109 through resistors 114 and 115, the cathode of tube 109 being grounded and the plate of tube 109 further being coupled through resistor 116 and capacitor 117 to the grid of tube 111. The gird of tube 111 is further biased via resistor 118 to a potential of —365 volts at terminal 119. The cathode of tube 111 is biased by —125 volts through cathode resistor 120 at terminal 121, the grid of tube 111 being additionally connected to a reset pulse $T_c$ through capacitance 123. The plate of tube 111 is also joined at the intersection of resistors 114 and 115 by way of diode 124, and further tied to output terminal 125 which is clipped to +15 volts at terminal 126 and —25 volts at terminal 127 by way of diodes 128 and 129 respectively. In reset condition with no signal having been applied to either of input terminals 104, tube 109 is nonconductive and tube 111 will be conducting current since its grid is positive with respect to its cut-off potential, thereby presenting a low potential at the plate which is clipped to —25 volts at output terminal 125. However, when positive signals occur (see wave form *7b*) simultaneously at both input terminals 104, the potential on the grid of tube 109 will cause this tube to conduct, thereby lowering the potential on the plate of tube 109 and the grid of tube 111, and terminating conduction in tube 111 and therefore raising the potential of its plate which will be clipped to +15 volts at output terminal 125. The +15 volt condition is fed back via diode 124 to maintain the grid of tube 109 at a positive potential so as to sustain a positive output at terminal 125 for a period until reset by a reset pulse fed via terminal 122 and capacitance 123 to cause tube 111 to become conductive.

Primer 103 (as shown in FIG. 7) is coupled to a conventional inverter 131 and thence to an input of AND gate 79, the output signal of primer 103 further being fed to an input of AND gate 81, and also tapped to be connected to one input of AND gate 132. Similarly, the output of AND gate 132 is coupled to the input of primer 133 which is fed to output signal inverter 134 and thence to AND gate 81, the output of primer 133 also being coupled directly to AND gate 82, and tapped to be connected to an input of AND gate 135. In the same manner, the output of AND gate 135 is connected to the input of primer 136, which output is coupled to inverter 137 and thence to AND gate 82, the primer 133 output also being coupled to AND gate 83 and the AND gate 100. The output of AND gate 100 is coupled to lead 120 via primer unit 110. Primers 133, 136 and 110 may be like the primer 103 and are reset in the same manner as primer 103 and are reset in the same manner as primer 103, that is by end-of-character pulse $T_c$. The output of AND gates 79, 81, 82 and 83 are termed stream one ($S_1$), stream two ($S_2$), stream three ($S_3$), and stream four ($S_4$), respectively, the streams being indicative of the number of streams in any one character, and the sequence in which the streams are observed by the scanning mechanism.

In operation, stream counter 76 is employed to sequentially count the number of streams present in any one character as the same is progressively scanned, either by scanning mechanism similar to that in the instant embodiment, or by a timed pulse samplying system. Having assumed that $T_c$ has reset the primers 103, 133, and 136, to put stream counter 79 in a reset condition for counting the streams as observed in the character to be presented, all the primers 103, 133, and 136 will be in a condition wherein tubes 109 are non-conducting, thereby providing a negative output potential at terminal 125, which inverted by inverters 131, 134 and 137, respectively, will present a positive potential at AND gates 74, 81, and 82. The first recognition pulse from AND gate 75 (see wave form 7a) will be coupled via lead 78 to AND gate 79 where there is also present a positive pulse from inverter 131 (see wave form 7d), thereby enabling AND gate 79 to effect a positive pulse (see wave form 7c) indicative of the first stream encountered, whereas AND gates 81, 82, and 83 are each disabled by the negative potential applied directly from primers 103, 133, and 135, respectively. Also, from point 84, the negative going slope of the recognition pulse R will trigger the differentiating inverter 85 to effect a positive going spiked output potential coupled to primer 103 and AND gates 132, 135, and 100, the latter AND gates not being activated due to the negative potential inputs fed from primers 103, 133, and 136, respectively (see wave forms 7c and 7g). Primer 103 will be triggered by the spiked pulse from differentiating inverter 85 to effect a positive output potential (see wave form 7c) which remains until reset by $T_c$, thereby disabling AND gate 79 via inverter 131, yet priming AND gate 132 for a subsequent recognition pulse, and presenting a positive potential at one input of AND gate 81.

The second recognition pulse from AND gate 75 (see wave form 7a) will be coupled via lead 78 to pass through AND gate 81 only to produce a positive pulse indicative of the second stream encountered, as AND gates 79, 82, and 83 are each disabled by a negative potential from the output of inverter 131, primer 133, and primer 136. The differentiating inverter 85 responds to the second recognition pulse to cause a spiked output potential at the trailing edge thereof which will be ineffective at the inputs of primer 103, AND gate 135, and the AND gate 100. However, AND gate 132, primed by a positive potential from primer 103 (see wave form 7f) will permit triggering of primer 133 to produce a positive potential (see wave form 7g) which remains until reset by $T_c$, at AND gates 82 and 135, yet producing a disabling potential at AND gate 81 via inverter 134. Similarly, a third recognition pulse would enable AND gate 82 to produce a positive pulse indicative of the third stream encountered, as AND gates 79, 81 and 83 would each be disabled by a negative potential from inverter 131, inverter 134, and primer 136, respectively, and primer 136 would then be turned on to produce a positive potential output (which would occur in an extended portion of wave form 7k) at AND gates 83 and 100 until reset by pulse $T_c$. Finally, in the same manner, a fourth recognition pulse would enable AND gate 100 to activate primer 110, and enable AND gate 83 to effect a positive pulse indicative of the fourth stream encountered in the character, as AND gates 79, 81 and 82 would each be disabled by a negative potential from invertors 131, 134 and 137, severally. The output of primer 110 on lead 120 will be employed as hereinafter disclosed in FIG. 31.

The output of AND gates 79, 81, 82 and 83 are coupled to the inputs of OR gates 138, 139, 141 and 142, respectively, (FIG. 3), the outputs of the latter being connected to mutual output leads 143, 144, 145 and 146, which leads are tapped respectively by leads 152, 153, 154 and 155, the latter leads being the input to pattern record matrix 15b.

Pattern record matrix

Figure 10:
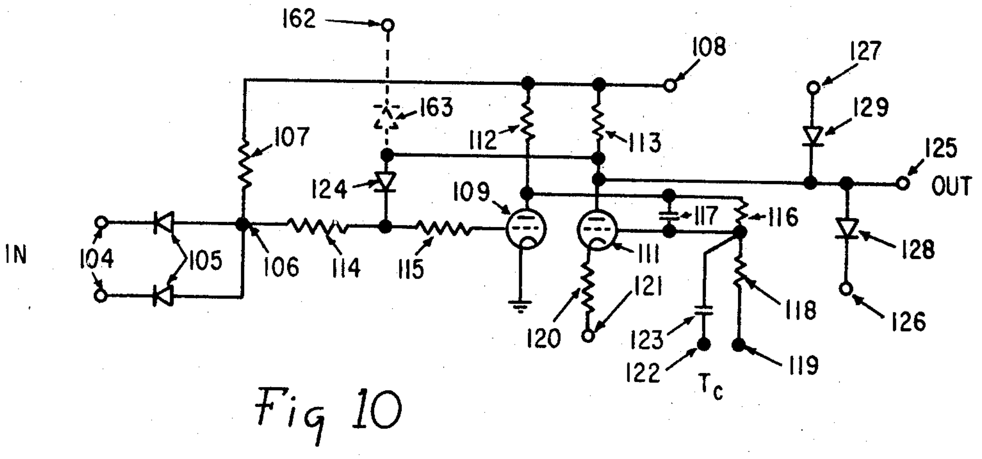
FIG. 10 shows the primer and special plate reset primer circuitry.
Figure 14:
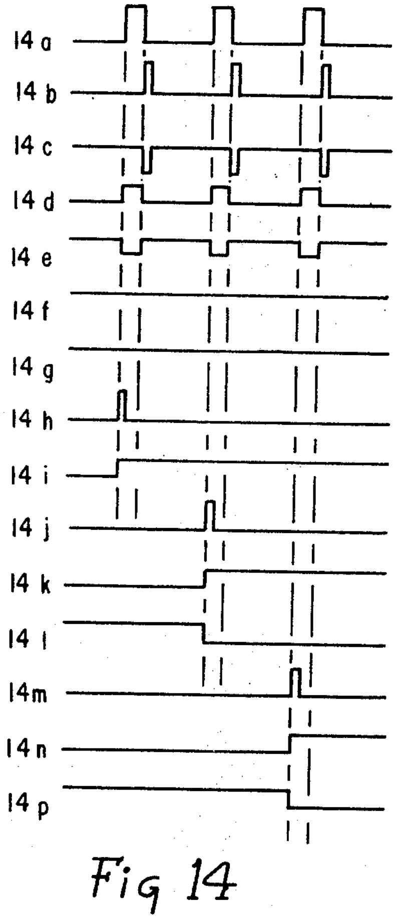
FIG. 14 illustrates a series of time-related voltage wave forms showing time variant voltages at the corresponding points indicated in the pattern control matrix unit.
Figure 19:
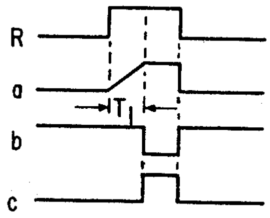
FIG. 19 illustrates a series of time-related voltage wave forms showing time variant voltages at the corresponding points indicated in the measuring unit and special measuring unit circuitry.
Figure 11:
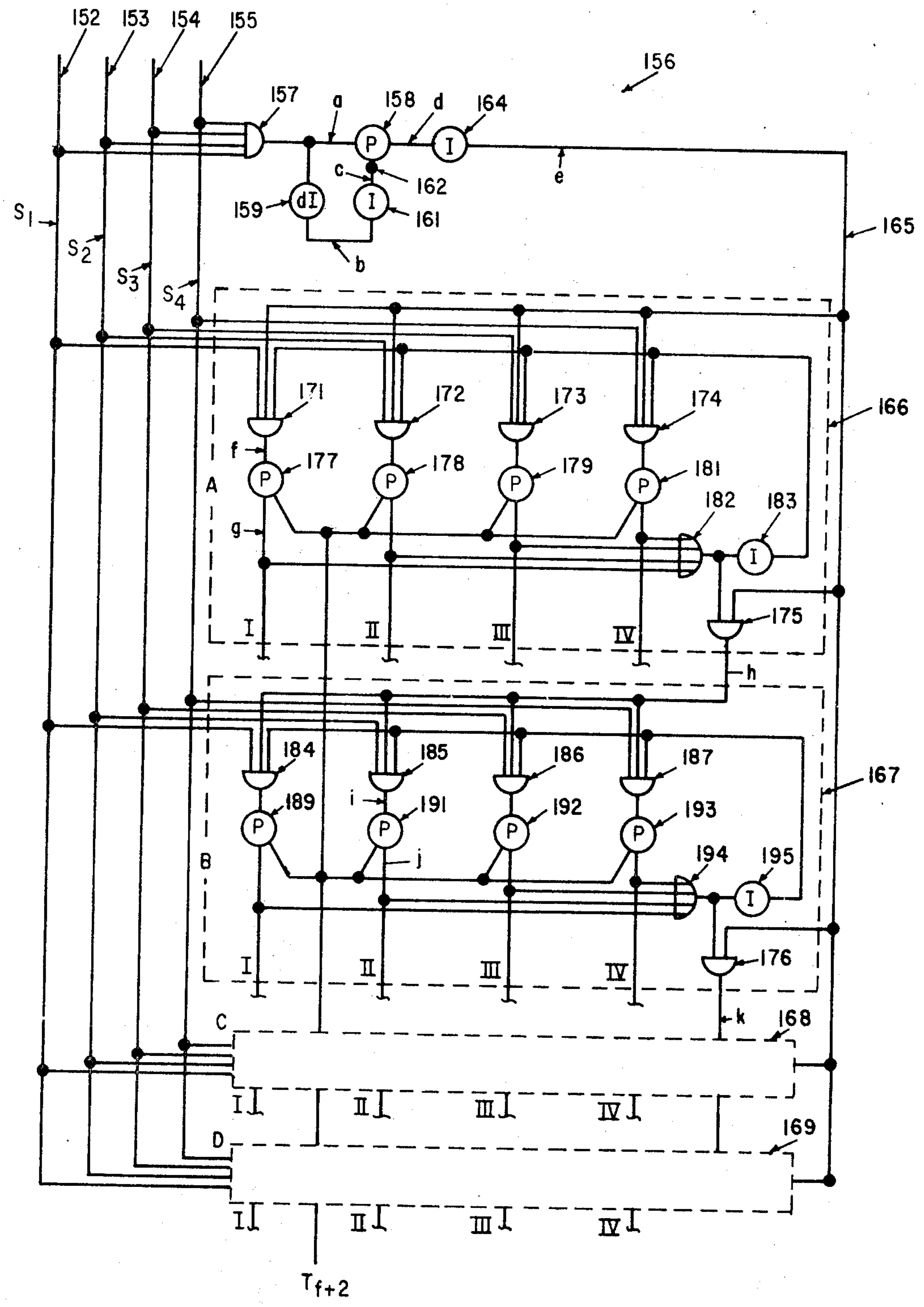
FIG. 11 is a detailed schematic diagram of the pattern record matrix unit.

In FIG. 11 there is illustrated in schematic form the pattern record matrix 156, wherein an OR gate 157 is coupled from each of the four leads 152, 153, 154, and 155, and thence to both a primer 158 and a differentiating inverter 159 similar to that previously described, the output of differentiating inverter 159 being connected to inverter 161 and thence to the plate diode reset 162 of primer 158 (see broken line showing in FIG. 10). The preferred embodiment of this primer stage is similar to that disclosed in FIG. 10 illustrating the primers in the stream counter, the only difference being the addition of a diode 163 coupled to the diode 124, the plate of diode 163 being connected to the reset terminal 162. In operation, assuming that the primer has been put in ON condition, a negative potential applied to the plate reset terminal 162 will pull down the voltage on the plate of tube 111 to a value resetting the primer from its positive output condition to a negative output condition.

The output of primer 158 is connected to inverter 164, thence via lead 165 to each of AND gates 171, 172, 173 and 174 in the stream position indicator unit denoted by the circuitry within broken lines 166 or A, and also to each of the output AND gates 175, 176, and those not shown within boxed areas 168 or C and 169 or D, each of the latter boxed areas consisting of stream position indicator circuitry identical to that disclosed within the blocked area surrounded by broken lines 167 or B. Each of the AND gates 171, 172, 173, and 174, is connected to the leads 152, 153, 154 and 155, respectively, and to mutual primers 177, 178, 179, and 181, the outputs of which are connected to OR gates 182, then to each inverter 183 and AND gate 175. The output of inverter 183 is coupled back into the input of AND gates 171, 172, 173, and 174. AND gates 184, 185, 186 and 187 are each connected to AND gates 175, and to the leads 152, 153, 154, 155, respectively, and to associate primers 189, 191, 192, and 193, the output from each of the latter primers being connected to OR gate 194, then to both inverter 195 and AND gate 176, the output of inverter 195 being coupled back to the input of AND gates 184, 185, 186, and 187. The output of AND gate 176 is connected to blocked area 168, the output of the latter further connected to blocked area 169, which blocked areas 168 and 169 are comprised of stream position indicator circuitry identical to that disclosed within the area surrounded by broken lines 167. Except for primer 158, all primers are reset by $T_{f+2}$ at the end of a frame scan (see FIG. 5).

The pattern record matrix 156 is employed to determine the subsequent sequential occurrence of the streams in any one frame, which streams have been identified and assigned a number in the stream counter, as a character is being scanned. For example, in FIG. 4, it is apparent that the streams identified as numbers one and two by the stream counter 76 will be the top and bottom stroke respectively, considering that a scan travels from top to the bottom of the character. However, in the scan frame y, the middle stroke, identified as stream three by the stream counter, will be, in fact, the second stream presented to the scanning apparatus during the scan y, and thus, the pattern record matrix will indicate the following:

| Recognition sequence of the streams encountered in scan "y" | Stream number |
|---|---|
| First | One |
| Second | Three |
| Third | Two |

In operation, signals will be sequentially routed on the leads 143, 144, 145, and 146 (see FIG. 3), depending on whether the information received by the scanning mechanism from the document has been identified as stream one, two, three, or four, respectively. The operation of the pattern record matrix 156 will be explained in conjunction with the character disclosed in FIG. 4 during a scan z. The top stroke of the character which is intersected by the scan line to produce a recognition signal therefrom, is identified as stream one and will appear as a signal on lead 143 and thence to lead 152 to be fed into the pattern record matrix where the lead 152 is tapped to feed the signal to enable OR gate 157, the output of which triggers primer 158 (see wave form 12*a*). The output from OR gate 157 is also operated upon by differentiating inverter 159 to produce a positive spiked pulse (see wave form 12*b*) at the trailing edge of the input recognition, which is inverted by inverter 161 (see wave form 12*c*), and coupled to primer 158 for resetting the same. The primer output (see wave form 12*d*) is operated on by inverter 164 (see wave form 12*e*) and then applied to AND gates 171, 172, 173, and 174, while AND gate 171 is further being pulsed by a positive potential from lead 152, and by a positive potential from inverter 183 to thereby enable only AND gate 171 (see wave form 12*f*), and energize primer 177. The output of primer 177 (see wave form 12*g*) passes through OR gate 182 and thence to inverter 183 to cause a negative potential for disabling AND gates 171, 172, 173, and 174 during the remainder of the scan frame and, at the same time, present a positive output potential from unit 166 at output I (primer 177 output) until primer 177 has been reset at the end of a frame by pulse $T_{f+2}$. Therefore an output at A–I on the pattern record matrix (FIG. 11) indicates that the first stream (A) encountered during the frame scan z was stream one (I). It is noted at this point that the output from inverter 164 is down just as the primer 177 comes on, and that the inverter 164 output remains down until the end of the stream so that AND gate 175 will not produce an output until the first stream pulse has ended.

When the middle stroke of the character disclosed in FIG. 4 is intersected by the scan line z to produce a recognition signal therefrom, which has been identified as stream three by the stream counter 76 to appear as a signal on lead 145 and thence to line 154, a pulse produced on line 165 similar to that shown in wave form 12*e* enables AND gate 175 and applies the output to AND gates 184, 185, 186, and 187, while AND gate 186 is further being pulsed by positive potentials from lead 154 and, by a positive potential from inverter 195, to thereby enable only AND gate 186 and energize primer 192, the output of which passes through OR gate 194 and thence to inverter 195 to cause a negative potential for disabling AND gates 184, 185, 186, and 187, during the remainder of the scan frame and at the same time present a positive output potential from unit B at output III (primer 192 output) until primer 192 has been reset at the end of a frame by pulse $T_{f+2}$. Therefore, an output at B–III on the pattern record matrix indicates that the second stream (B) encountered during the frame scan z was stream three (III). In a similar manner, when the bottom stroke of the character is intersected by the scan line 2 to produce a recognition signal therefrom, which has been identified as stream two by the stream counter 76 to appear as a signal on lead 144 and thence to line 153, the output from the pattern record matrix will occur at C–II, indicating that the third stream (C) encountered during the frame scan z was stream two (II). It is then apparent that since no further streams exist during the scan frame z, the output of unit D, or 169, will be zero.

The pattern control matrix 197 is reset to zero at the end of each scan frame by a $T_{fd}$ pulse (see FIG. 5), slightly earlier in time than $T_{f+1}$. Prior to the application of the reset pulse at $T_{f+2}$, the signal (s) stored in the output primers of the pattern record matrix 156 are transferred at $T_{f+1}$ (see FIG. 5), to be fed into the zero set pattern control matrix 197 as well hereinafter be disclosed. Thus, the pattern control matrix will contain the switching instructions disclosing the orderly sequence of occurence in the succeeding frame of the numbered signals which have been identified by stream counter 76.

Pattern control matrix

Figure 13:
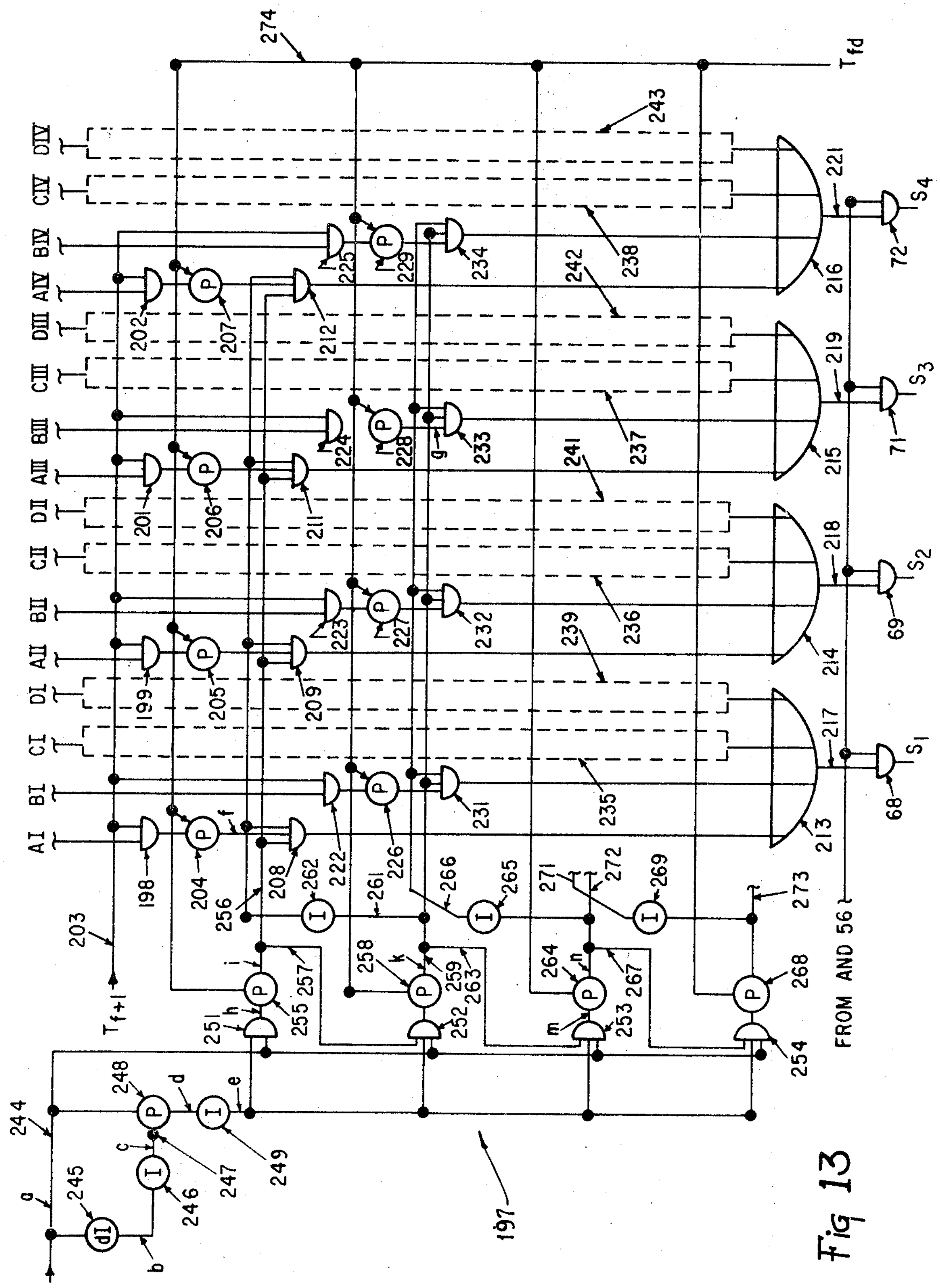
FIG. 13 is a detailed schematic diagram of the pattern control matrix unit.

A preferred embodiment of the pattern control matrix 197 is shown in detail in schematic form in FIG. 13, wherein each of the primer outputs, A–I, A–II, A–III, and A–IV, of the pattern record matrix 156, is coupled to AND gates 198, 199, 201, and 202, respectively, each of the latter AND gates being further coupled from lead 203 connected to the source of $T_{f+1}$ pulses. The outputs from these AND gates are connected to primers 204, 205, 206, and 207, and thence to AND gates 208, 209, 211, and 212, the outputs of which are in turn coupled to OR gates 213, 214, 215, and 216, respectively, while the output of the latter OR gates are connected via leads 217, 218, 219, and 221, to AND gates 68, 69, 71, and 72, respectively.

In a similar manner, each of the primer outputs B–I, B–II, B–III and B–IV of the pattern record matrix 156 is coupled to AND gate 222, 223, 224, and 225, respectively. Each of the latter AND gates are coupled from lead 203, connected to the source of the $T_{f+1}$ pulse, and the outputs therefrom are connected to primers 226, 227, 228, and 229, and thence to AND gates 231, 232, 233, and 234, the outputs of which are respectively coupled to OR gates 213, 214, 215, and 216. Similarly, each of the primer outputs C–I, C–II, C–III, and C–IV, of pattern record matrix 156, is connected to OR gates 213, 214, 215, and 216, respectively, via identical circuitry represented by blocks 235, 236, 237, and 238. And finally, each of the primer outputs D–I, D–II, D–III, and D–IV, of the pattern record matrix 156, is connected to OR gates 213, 214, 215, and 216, respectively, via identical circuitry represented by blocks 239, 241, 242, and 243.

Figure 9:
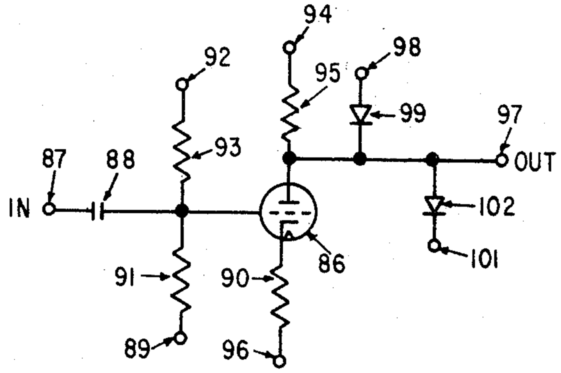
FIG. 9 shows the differentiating inverter stage circuit.

There are further fed into the pattern control matrix 197 from delay 58, delayed signals along a lead line 244 coupled to a differentiating inverter 245 of the type shown in FIG. 9, thence to an inverter 246 from which a lead is connected to the plate reset 247 of primer 248, of the type disclosed in FIG. 10. The lead 244 is further coupled directly to an input of the primer 248, the output of which is connected to inverter 249 and thence to one input of each of the AND gates 251, 252, 253, and 254, the latter AND gates also being directly coupled to lead 244. The output of AND gate 251 is connected to a primer 255 and thence to lead 256 which is coupled to an input of AND gates 208, 209, 211, and 212, the lead 256 being tapped by lead 257 and coupled to an input of AND gate 252. The output of AND gate 252 is connected to a primer 258, and thence to lead 259, which is coupled to AND gates 231, 232, 233, and 234, lead 259 being tapped by a lead 261 connected to inverter 262 and thence to each of the AND gates 208, 209, 211, and 212. Lead 259 is further tapped by lead 263 which is connected to an input of AND gate 253, the output of which is connected to primer 264. A portion of the primer output is coupled via inverter 265 and lead 266, to each of the AND gates 231, 232, 233, and 234, the primer 264 output further being tapped by lead 267 to be connected to AND gate 254, the output of which is coupled to primer 268, a portion of the output being fed to inverter 269, and thence via lead 271. Leads 271 and 272 are coupled to the circuitry represented by blocks 235, 236, 237 and 238, in the same manner as are leads 266 and 259, and similarly, lead 273 is coupled to the circuitry represented by blocks 239, 241, 242 and 243. Note that all primer outputs except for primer 248 in the pattern control matrix 197 are reset to a negative potential via lead 274 at time $T_{fd}$.

In operation, at time $T_{fd}$, the pattern control matrix as a whole is reset to zero condition via lead 274. As observed in the operation of the circuitry pattern record matrix 156, shown in schematic form in FIG. 11, a scan *y* of the character illustrated in FIG. 4 will produce signals at output points A–I, B–III and C–II, which are respectively fed to AND gates 198, 224 and the appropriate AND gate in block 236. As pulse $T_{f+1}$ occurs, it will therefore enable AND gates 198, 224 and the gate in block 236 to thereby activate primers 204, 228, and the appropriate primer in block 236, the output of said primers being fed to respective AND gates 208, 233, and a corresponding AND gate in block 236, the signals to remain until such primers are reset at the end of the current frame period. As frame *z* begins the delayed signals from the previous scan, frame *y* will be fed from the delay 58 via lead 244 into the pattern control matrix (see wave form 14*a*), and a portion of the signal will be employed (see wave form 14*e*) in conjunction with the original signal shown at wave form 14*a* to enable only AND gate 251, as the outputs of primers 255, 258 and 264, (wave forms 14*i*, 14*k*, and 14*n*) will disable AND gates 252, 253 and 254 respectively. The output of AND gate 251 will flip the bistable primer 255 to form a delayed positive output potential (see wave form 14*h*) to be fed to AND gates 208, 209, 211, and 212, and further to ready AND gate 252 for a succeeding recognition signal (see wave form 14*a*). Since at this time the output of inverter 262 (see wave form 14*e*) is positive due to the negative output of primer 258, AND gate 208 will be enabled and the signal will be conducted to OR gate 213 and via lead 217 to AND gate 68 (see also FIG. 3). Provided that during scan *z* a recognition signal is detected approximately at the same time as the delayed signal from scan period *y*, undoubtedly it is a continuation of a character stroke and is fed via lead 55 to enable AND gate 56 and applied to AND gates 68, 69, 71 and 72. However, only AND gate 68 will be enabled indicating that the first stream occurring is stream one as previously identified by the stream counter 76, and therefore OR gate 138 will be enabled to apply a signal input to output lead 143.

Similarly, the second delayed recognition signal encountered (see wave form 14*a*) will enable only AND gate 252 to flip the bistable primer 258 forming a delayed positive output potential (see wave form 14*k*) to feed AND gates 231–234, and further to ready AND gate 253 for the succeeding recognition signal. Since, at the same time the output potential of inverter 265 is positive (see wave form 14*p*), AND gate 233 will be enabled and the signal will be conducted to OR gate 215, thence via lead 219 to AND gate 71, and if a recognition signal (as it does in the instant case) appears from AND gate 56 during the scan period *z*, AND gate 71 will be enabled to have a signal input applied to output lead 145 via OR gate 141. In the same manner, the signal C–II applied to circuitry 236 will be enabled by the succeeding delayed recognition signal (wave form 14*a*) to be fed to AND gate 69 via OR gate 214 and lead 218, and the third recognition signal in scan *z* will appear from AND gate 56 enabling the same to have a signal input applied to output lead 144 via OR gate 134.

The overall operation of the stream following system as disclosed in FIG. 3 will now be described. It is assumed that delay 58 is empty and that stream counter 76 has been reset by an end-of-character pulse, $T_c$, so that it is standing on one, and that a scan *v* of the character disclosed in FIG. 4 is being initiated, this being the first scan frame wherein any portion of the character will be intersected by the scanning mechanism shown in FIG. 1. Since delay 58 is empty, there will be no signal entering OR gate 65 and therefore the output of inverter 77 will enable AND gate 75 so that the first recognition signal to come along (intersection of the top stroke of FIG. 4), will pass through the AND gate 75. Because the stream counter 76 is standing on one, the recognition signal will enable AND gate 79 and pass through OR gate 138 to appear at the stream one output lead 143 ($S_1$). The fact that the first recognition pulse appeared on stream one will cause the pattern record matrix 156 to record the information one-first or A–I. This same recognition signal which is being routed to output lead 143 ($S_1$), is being entered into the delay 58. As soon as the recognition signal terminates, the stream counter 76 advances and stands on two. When the second recognition pulse occurs during scan *v* (intersection of the lower stroke of the character shown in FIG. 4), this pulse will be routed to output lead 144 ($S_2$) via AND gate 75, and AND gate 81, and OR gate 139. Appearance of this second pulse will cause the pattern record matrix 156 to record the information two-second or B–II. When this pulse terminates, the stream counter 76 again advances and stands now on three. No further recognition pulses will occur during this scan and the following events will occur during the remainder of this scan and the time between scans. The pattern control matrix 197 will be reset to zero by the $T_{fd}$ pulse; the information stored in the pattern record matrix 156 will be transferred to the pattern control matrix 197 at $T_{f+1}$ so that the pattern control matrix 197 will now contain the switching instructions one-first or A–I, and two-second or B–II; and the pattern record matrix 156 will be reset at $T_{f+2}$ so that it is ready to record the sequence fo recognition pulses during the following scan.

During scan *y* of the character disclosed in FIG. 4, it will be noted that a new stream is encountered before the stream two. When the prior scan recognition signal stream one emerges from delay 58, it will advance the pattern control matrix to one. The current recognition signal (intersection of the top stroke of the character during the *y* scan) when occurring at the same relative time in a frame period that the stream one signal from the previous frame is emerging from the OR gate 65 via delay 58 and elongated by pulse stretcher 64, will enable AND gate 56 which output will enable AND gate 60 denoting that the present recognition signal is a continuation of stream one. Once the signal is validated as part of the previous stream one, AND gate 56 is held open through OR gate 65, and at the same time disabling AND gate 75. The signal which is validated by stream one emerging from AND gate 60 is switched to the stream one output lead 143 ($S_1$) via wire 217, AND gate 68, and OR gate 138. The pattern record matrix 156 records the information one-first. As the new stream is encountered (middle stroke of the character) during scan *y* before stream two, the new pulse will be routed to output lead 145 ($S_3$) by the stream counter 76 via AND gates 75 and 82, and OR gate 141. The pattern record matrix 156 will record this information as three-second and, of course, the new signal will enter delay 58. In the same manner as above (with reference to stream one), when stream two emerges from delay 58, it disables AND gate 75, advances the pattern control matrix 197 to two and causes any signals validated as part of the previous stream two by stream two delayed, to be switched through AND gate 69 and OR gate 139 to output lead 144 ($S_2$), and the pattern record matrix 156 will record the information two-third.

Since no further recognition pulses are encountered during this scan, the switching instructions transmitted from the pattern record matrix 156 to the pattern control matrix 197 will be one-first, three-second, and two-third. Then recognition signals validated during the following scan *z* will be switched in that sequence.

RECOGNITION PATTERNS

In recognizing the character within the font(s) of type being scanned, which in the preferred embodiment of the present invention is disclosed as hand written Arabic numerals zero through nine as shown in FIG. 46, the signals R, $S_1$, $S_2$, $S_3$ and $S_4$, which have been developed as heretofore described, are utilized to develop a set of basic intracharacter patterns sufficient to identify each character within the font(s) of type being scanned. A preferred set of such patterns is disclosed in the left vertical column of FIG. 15 and are defined as follows:

LVL—long vertical line (actually only a certain selected portion of the entire character height)
2LVL—two of the long vertical lines as disclosed above
US—upper split
UJ—upper join
LS—lower split
LJ—lower join
UH—upper horizontal
SAJ—split after join The above set of intracharacter patterns which will be explained in detail hereinafter, and the conventional set of Arabic numbers zero through nine are together employed in a truth table as shown in FIG. 15, wherein the vertical columns of plus and minus characters below the numerals represent the criterion of presence and absence, respectively, of the associated patterns for recognition of that particular numeral. Those portions of the truth table which are blank indicate that it makes no difference whether or not the associated patterns are detected. Each set of necessary criteria representing a particular character is fed to an AND gate which, when pulsed by all of the necessary criteria inputs, indicates recognition of that character. An example is shown in FIG. 16, where the necessary criteria to be present for the recognition of a numeral three are: the absence of LVL, the absence of US, the presence of UJ, the presence of LS, the presence of LJ, the presence of UH and the absence of SAJ. When all of the latter criteria are present, the AND gate will be pulsed at $T_c$ sample time indicating that the character being scanned is the numeral three.

The unique sets of criteria which are possible by employing signals of the nature of R, $S_1$, $S_2$, $S_3$ and $S_4$ are capable of enabling the device to read a large number of font(s) of type due to the basic intracharacter similarities of stream crossings, stream joins, etc., thus introducing a true multi-font reading capability within such characters. By pre-determined programming, not only font(s) of type but hand-written characters as well are subject to easily being read.

LVL and 2LVL logic

FIG. 17 illustrates a schematic form, the preferred embodiment of the logic circuitry of the feature detector utilized to determine the patterns LVL and 2LVL wherein a scan recognition in the form of pulse information signal R is fed to a measuring unit 281 via lead 50.

An exemplary embodiment of measuring unit 281 is shown in FIG. 18, wherein the recognition signal R is applied to input terminal 282, which is tied to the control grid of pentode 283 via diode 284. $T_f$ sample in some instances (not the present instance wherein terminal 285 is left hanging) is also applied, via terminal 285, to the grid of pentode 283 through a diode 286 the grid being also coupled to +100 v. by way of a variable resistor 287 and further coupled to ground by way of capacitor 288. The plate of tube 283 is connected to a positive potential at terminal 289 via resistor 291, and also tapped at point 292 to be coupled to an inverter 293, the output of which is connected to terminal 294.

Wherever in this specification a measuring unit is called for an associated inverter is understood to be included as shown in FIG. 18. In operation, the measuring unit 281 is employed to eliminate an initial portion of the recognition pulse R by a time factor to be equal to, or slightly greater than, the period required for a vertical scan to cross the width of a horizontal stroke of a typical character being scanned. The time factor is therefore adjustable to any given set of criteria and is controlled by way of varying resistance 278 and by selection of the appropriate value for capacitance 288 in the RC circuit, comprising resistance 287 and capacitor 288, which thus varies a time period $T_1$( see wave form 19*a*) required for raising the potential of the capacitor 288 at the grid of the voltage necessary for conduction of tube 283. As the capacitor charges up beyond time $T_1$, the tube will conduct thus bringing down the voltage of point 292 at the plate of tube 283 (see wave form 19*b*). The signal at point 292 is then inverted by unit 293 to present a signal (see wave form 19*c*) at the output terminal 294 which is the difference between the time duration of input signal R and time period $T_1$.

The output signal of measuring unit 281 is coupled to a primer 295 (similar to that disclosed in FIG. 10), which is reset by a $T_{fd}$ pulse, the latter primer being connected to inverter 296, thence to one input of AND gate 297, the other input of which is connected to a source of $T_f$ pulse. The output of AND gate 297 is coupled to a special primer 298, also being reset by a $T_{fd}$ pulse, and thence to an input of AND gate 299 and inverter 301. Measuring unit 281 is also coupled to a special measuring unit 301 which is reset by the output of inverter 301. An exemplary embodiment of the special measuring unit 302 is also shown in FIG. 18, except that there is a diode 303 coupled to capacitor 288 in lieu of lead 304, and a further connection to the lead intermediate diode 303 and capacitor 288 from a terminal 305 via diode unit 306.

Special measuring unit 302 operates in a similar manner to the measuring unit 281 heretofore described, except that due to the blocking action of diode 303, the capacitor will retain its previous charged state unless discharged by a reset pulse of a negative potential from inverter 301. Further, the RC circuitry of the special measuring unit 302 is adjusted to have a much longer time period $T_2$ for raising the potential of the capacitor 288 at the grid to the voltage necessary for conduction of tube 283. The time period $T_2$ will represent the set value for establishing what a long vertical line (LVL) is.

The output of special measuring unit 302 is coupled to primer 307, thence to output terminal 308 (LVL), and thereafter to inverter 309, to output terminal 311 (—LVL). Primer 307 is further coupled to one input of AND gate 299, which has a third input connected from a pulse source $T_f$. AND gate is coupled to primer 312, then to AND gate 313, which has an input from the output of special measuring unit 302, the output of AND gate 313 thereafter being coupled to primer 314 with an output terminal 315 (2LVL), thence to output terminal 317 (—2LVL) via inverter 31*b*, the primers 307, 312, and 314 to be reset by a $T_{cd}$ pulse.

Figure 20:
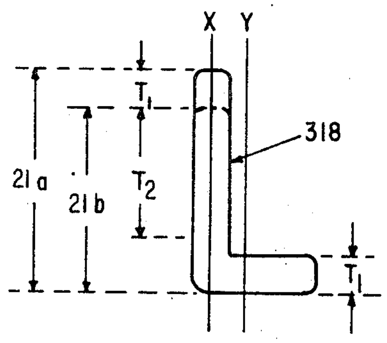
FIGS. 20, 22, 23 and 24 are used to illustrate the various character angles and configurations and their appearance to the vertical stream detector unit.
Figure 21:
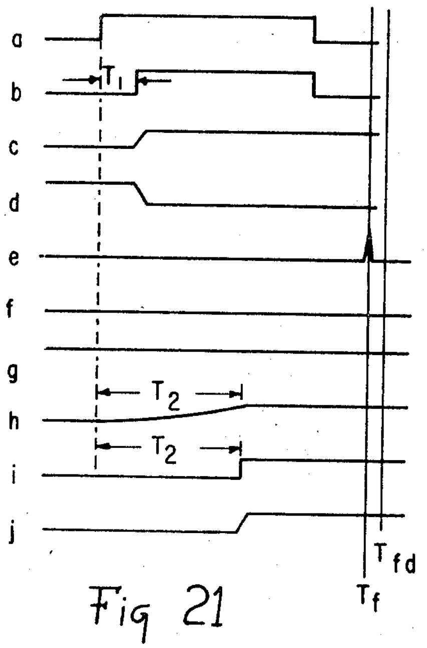
FIG. 21 illustrates a series of time-related voltage wave forms showing time variant voltages at the corresponding points indicated in the vertical stream-detector unit.
Figure 22:
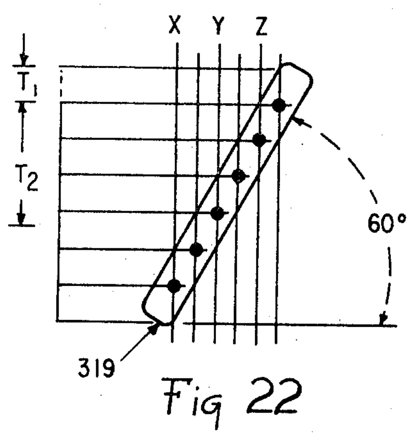

The operation of the LVL and 2LVL logic shown in FIG. 17 can best be described with relation to the scanning of the L-shaped figure, the inclined line, and the time-related voltage wave forms shown in FIGS. 20, 21 and 22. First, there is shown in FIG. 20, a long L-shaped figure 318, being scanning in vertical passes X and Y. As the recognition signal (see wave form 21*a*) is fed into and acted upon by the measuring unit 281, signal R is shortened by a time duration $T_1$ (see wave form 21*b*), the remaining signal being fed into the special measuring unit 301 whereupon it is shortened by a larger time factor of $T_2$ (see wave form 21*h*). Should a recognition signal have a sufficient time period to charge up the capacitor potential to the potential necessary for conduction of the special measuring unit 302, an output pulse (see wave form 21*i*) will be derived from special measuring unit 302, denoting that an LVL has been recognized during a scan X, to then activate primer 307 for presenting a signal (see wave form 21*j*) indicative of an LVL at output terminal 308 —LVL at output terminal 311. At the same time, the output signal (see wave form 21*b*) from measuring unit 281 will activate primer 295 which output (see wave form 21*c*) is inverted by unit 296 to introduce a negative signal (see wave form 21*d*) at AND gate 297 when a pulse $T_f$ (see wave form 21*e*) is fed to the same. The output of AND gate 297 is therefore at a negative potential to be inverted by unit 301 and applied to special measuring unit 302 for preventing unit 302 from being discharged. However, during a subsequent scan frame *y*, when the bottom portion of the L-shaped figure is intersected, no signal will be emitted from measuring unit 281 as the time period $T_1$ by which the recognition signal R is shortened, is either equal to or greater than the recognition signal. It is readily seen that since primer 295 is not energized, the output of inverter 296 will be down, producing an output from AND gate 297 when $T_f$ is present, to thence activate primer 298, the output of which is inverted by unit 301, to reset the special measuring unit 302 for the possible recognition of a second long vertical line during the scanning of the character. At the same time, AND gate 299 is activated to energize primer 312, conditioning AND gate 313 for the possibility of a subsequent LVL to be recognized within the same character by special measuring unit 302, in which case, AND gate 313 would be pulsed to energize primer 314 and thereby present at output terminal 315 a signal indicating 2LVL, and at output terminal 317, a signal indicating —2LVL.

Figure 23:
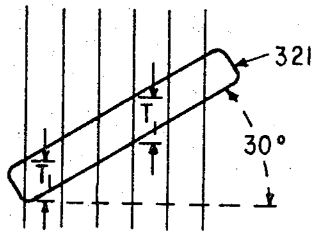
Figure 24:
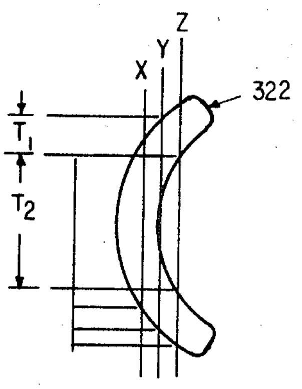

The logic circuitry of LVL and 2LVL in this embodiment will also recognize a slanted line 319 shown in FIG. 22 at an angle of sixty degrees, as vertical scan lines X, Y, and Z, will intersect a portion of the character during a time duration which is longer than $T_1$, allowing measuring unit 281 to pass a signal, and should line 315 be sufficiently long, subsequent scan lines will intersect the line allowing the measuring unit 281 to pass a number of portions of time-based signals which will charge up special measuring unit 302 in $T_2$ to activate the same, representing that an LVL has been recognized. In the preferred embodiment, if the unit time to scan the stroke width of a character is one, then the time factor for shortening recognition pulses entering the measuring unit 281 will be of a time duration of $$\frac{\text{one}}{\cos 30^\circ}$$

so that a signal from any one portion of an intrasected character line 321 (see FIG. 23) having an incline equal to or less than 30°, will not charge up measuring unit 281 and therefore could never be possibly read as LVL. It is noted at this point that a portion of a curved character 322 (see FIG. 24) is also capable of being recognized as a long vertical line LVL.

Thus, it can be appreciated that any portion of a character which, in the preferred embodiment, is inclined at an angle greater than 30° and has a length equal to or greater than a predetermined set value can be recognized as a long vertical line LVL within the character.

US and LS logic

Figure 25:
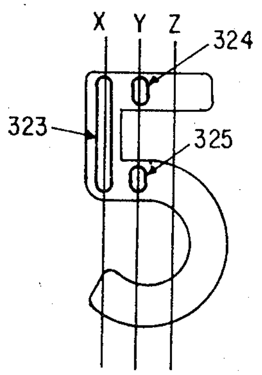
FIG. 25 illustrates, by way of example, the manner in which a stream split in a character is followed to be identified by the stream split detector.

Stream splits occur, as shown in FIG. 25, when one stroke portion 323 of a character, as seen by a scanning line X, is subsequently divided into two stroke portions 324 and 325 as seen by subsequent scanning line *y*. In order to recognize an upper split or a lower split, it is first necessary to determine whether a split has occurred and to associate the split, if any, with the original stream or that portion of the stroke which has been divided.

Figure 26:
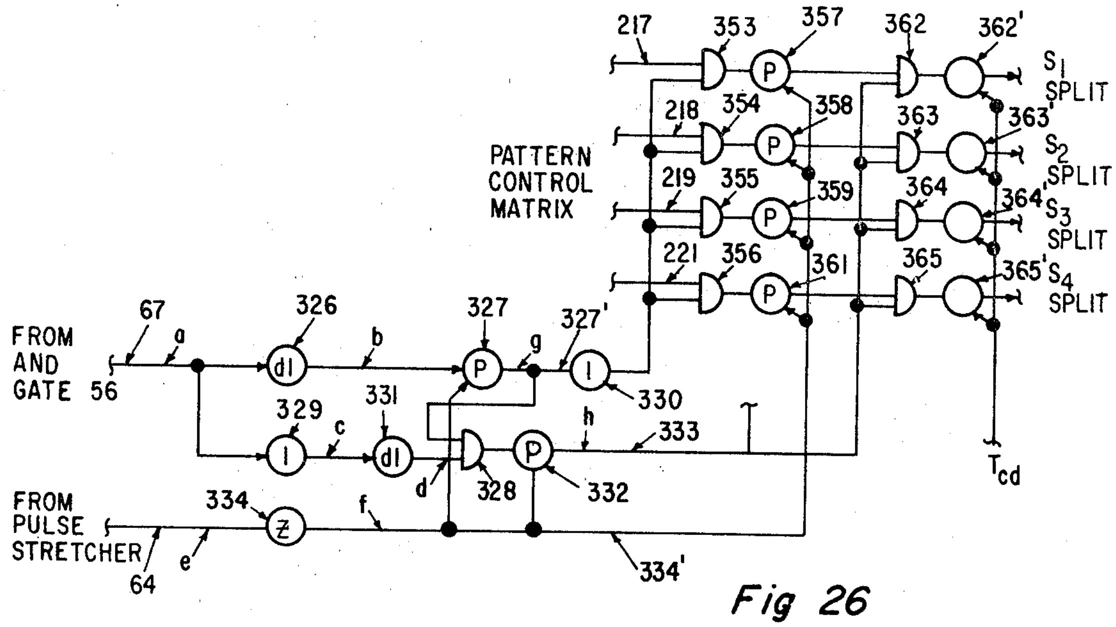
FIG. 26 is a schematic diagram of the stream split detector and register unit.

To accomplish the latter function, there is disclosed in FIG. 26, in schematic form, a preferred embodiment of the split feature detector logic circuitry required, wherein a signal on lead 67 from AND gate 56 (shown in FIG. 3) is coupled to differentiating inverter 32*b*, similar to that shown in FIG. 9, then to primer 327, similar to that shown in FIG. 10, which primer 327 has an output lead 327' and is connected to an input of AND gate 328. The signal on lead 67 is also coupled to inverter 329, thereafter to differentiating inverter 331, thence to an input of AND gate 328, the output of AND gate 328 being connected to output lead 383 via primer 332. The output from pulse stretcher 64 (see FIG. 3) is coupled to a reset unit 334, having an output lead 334', and thence to primers 327 and 332 for resetting the same.

Figure 27:
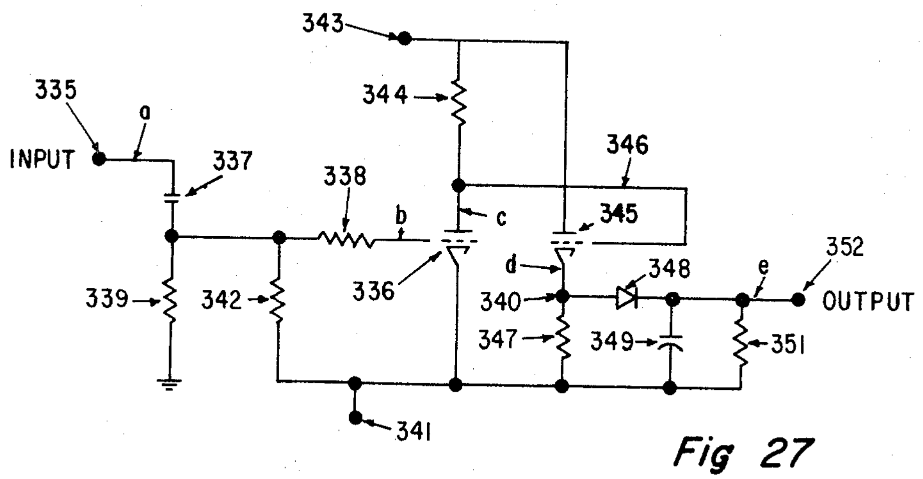
FIG. 27 is a schematic diagram of the special reset circuitry.
Figure 28:
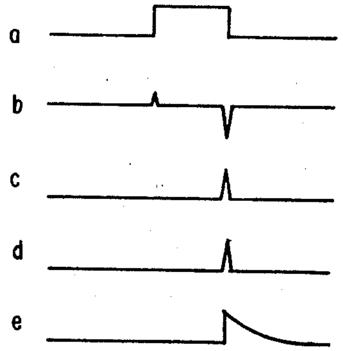
FIG. 28 illustrates a series of time-related voltage wave forms showing time variant voltages at the corresponding points indicated in the special reset unit.

An exemplary embodiment of the reset unit 334 is illustrated in schematic form in FIG. 27, wherein input terminal 335 is coupled to the grid of triode tube 336 via capacitor 337 and resistance 338. Intermediate the lead connecting capacitor 337 and resistance 338 is a connection to ground via resistor 339 and also to a —125 volt supply at terminal 341 via resistor 342. The plate of triode 336 is coupled to a +100 volt supply at terminal 343 via resistor 344, while the cathode of triode 336 is directly tied to terminal 341. The plate of tube 336 is directly coupled to the grid of triode 345 via lead 346. The plate of triode 345 is connected to terminal 343, and the cathode of tube 345 is tied to terminal 341 through resistor 347 in one path, through diode 348 and capacitor 349 in another path, and through diode 348 then resistor 351 in a third path, while the cathode of triode 345 is further connected to an output terminal 352 via the triode 348. In operation, tube 336 will normally be conducting due to the relatively positive potential on its grid, and tube 345 will be cut off. However, when a signal from pulse stretcher 64 is applied to the input terminal 335 of the reset unit (see wave form 28*a*), the trailing edge of the signal (see wave form 28*b*) will cause tube 336 to be instantaneously cut off, thereby making tube 345 conductive during this instant due to the positive pulse connected from the plate of tube 336 to the grid of tube 345 through lead 346 (see wave form 28*c*). Therefore, the grid of tube 345 for an instant becomes positive with respect to its cathode 340 (see wave form 28*d*), instantaneously charging capacitor 349, then allowing the capacitor 349 to gradually discharge through resistor 351 as shown in wave form 28*e* which signal appears at output terminal 352.

Output lead 327' (see FIG. 26) is connected by way of inverter 330 to each of the AND gates 353, 354, 355 and 356, the latter AND gates each being coupled from leads 217, 218, 219 and 221, respectively, from the pattern control matrix 197 shown in FIG. 3, indicating the sequential occurrence of the numbered streams from the prior scan frame. The AND gates 353, 354, 355 and 356 are coupled to AND gates 362, 363, 364, and 365, respectively, by way of respective primers 357, 358, 359 and 361. These AND gates 362, 363, 364 and 365 are each further coupled with lead 333 and thence to respective output primers 362', 363', 364' and 365', which denote a split in one of the respective streams $S_1$, $S_2$, $S_3$, or $S_4$. Primers 357, 358, 359 and 361 are reset by unit 334 via lead 334', and primers 362', 363', 364' and 365' are reset by $T_{cd}$ pulse.

Figure 29:
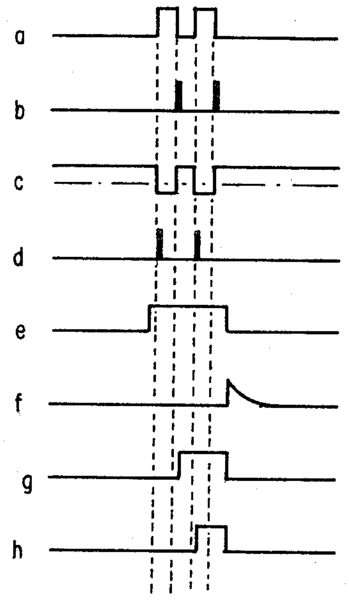
FIGS. 29 and 30 illustrate a series of time-related voltage wave forms showing time variant voltages at the corresponding points indicated in the stream split detector unit during a split and no-split, respectively.
Figure 30:
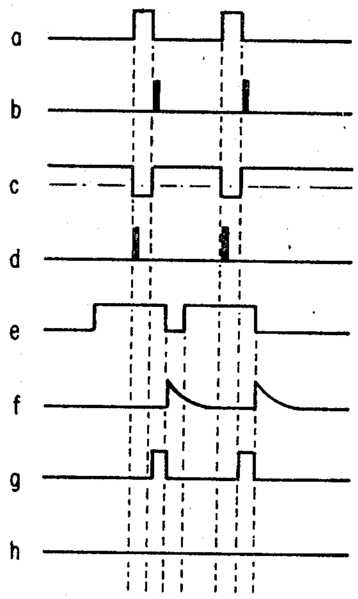

In operation, the stream split circuitry, disclosed in FIG. 26, will be described in conjunction with the time based wave forms shown in FIGS. 29 and 30. FIG. 29 portrays a time based wave form occurring during a stream split wherein the signal (wave form 29*a*) from AND gate 56 will be differentiated, inverted by unit 326 to form a spike (wave form 29b) on the trailing edge of each positive pulse. The same signal from AND gate 56 through a separate path is inverted by unit 329 and then differentiated, inverted by unit 331 (see wave forms 29c and 29d) to form positive spikes at the leading edge of the pulse shown in wave form 29a. The delayed pulse from the prior scan is acted upon by the pulse stretcher to form an elongated wave as shown in wave form 29e, and then, by means of reset unit 334, will form a sharp positive spike (wave form 29f) having a steep slope on the trailing edge of the pulse of wave form 29e, for resetting primers 327, 332, 357, 358, 359 and 361, after primer 327 has been activated by the signal from differentiating inverter 326, and after primer 332 has been activated by a signal from AND gate 328, occurring when simultaneous signals appear from primer 327 (see wave form 29g) and differentiating inverter 331, presenting at terminal 333 a pulse of short duration (see wave form 29h) due to reset mechanism 334, thereby denoting that a stream split has occurred. The signal denoting a stream split will be routed to the input of AND gates 362, 363, 364 and 365, one of which AND gates will be enabled by a signal indicative of the original stream number which has been split and has been associated with the top one of the two streams emerging from the split. The latter is accomplished by inverting the output of primer 327 to provide a signal representative of the top stream encountered in a split and matching the signal against each of the signal outputs from the pattern control matrix 197 (see FIG. 3) which indicates the original stream number, to therefore enable the proper one of the AND gates 353, 354, 355 or 356 to thus activate its respective primer 357, 358, 359 or 361, which primers are reset at the end of each stretched pulse signal by way of lead 334'. Thus there is presented at the output of either primer 362', 363', 364' or 365' a signal indicative of a particular original stream number which has been split as recognized by the scanning mechanism during the subsequent scanning frame.

When no stream split exists, the pulses occurring during the previous scan (wave form 30e) from pulse stretcher 64 will be equal in number to those pulses appearing from AND gate 56 (see wave form 30a) and, therefore, an equal number of reset pulses produced by reset unit 334 will, in effect, cause a non-coincidence of pulses in wave forms 30g and 30d at AND gate 328 to prevent a positive pulse from being presented on output lead 33 (see wave form 30h) denoting that a stream split has not occurred.

According to the preferred embodiment heretofore set forth, wherein an upper split and/or a lower split represents at least a portion of the criteria utilized for recognizing characters, it is next necessary to determine which of the originally numbered streams is, in fact, the uppermost stream within any character, so that an upper stream split may be differentiated from a lower stream split, the latter to be representative of every split within a character which is not derived from an upper stream.

Figure 31:
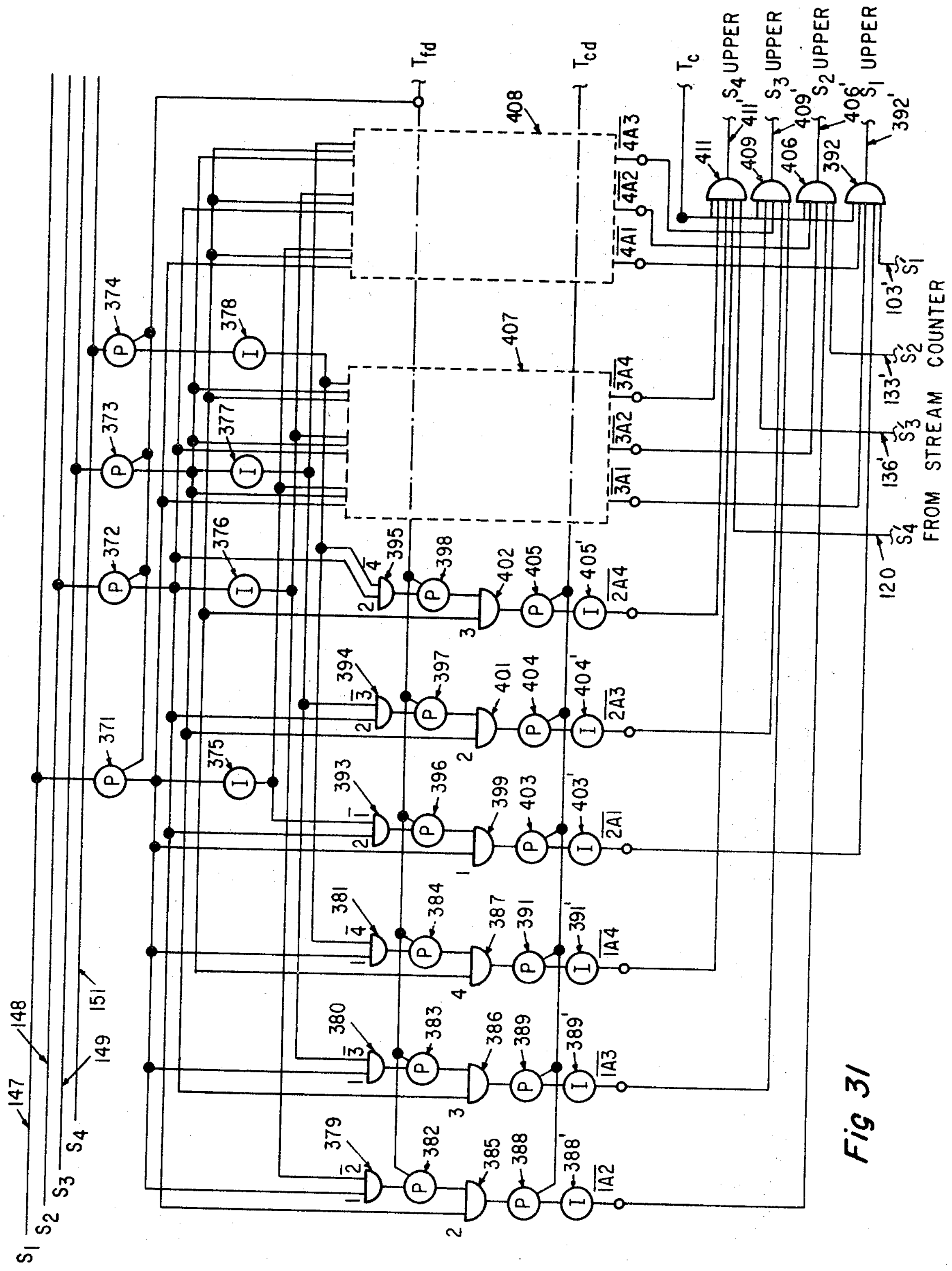
FIG. 31 is a schematic diagram of the stream position circuitry.

Circuitry for determining which of the originally numbered streams is, in fact, the upper stream is disclosed in FIG. 31, in schematic form, wherein primers 371, 372, 373 and 374 are respectively connected from leads 147 ($S_1$), 148 ($S_2$), 149 ($S_3$) and 151 ($S_4$) and coupled to associated inverters 375, 376, 377 and 378. By employing the outputs of the aforesaid primers and inverters, selected combinations can be achieved for determining factors which may further be selected to indicate the upper stream. As shown, a signal, indicative of stream one, is fed from primer 371 and coupled to each of AND gates 379, 380 and 381, which AND gates are further respectively connected from inverters 376, 377 and 378. The AND gates 379, 380 and 381 are coupled to primers 382, 383 and 384, respectively, the output of which is connected to one input of associated AND gates 385, 386 and 387. The inputs to AND gates 385, 386 and 387 are further connected to primers 372, 373 and 374 respectively, their outputs being applied to associated inverters 388', 389' and 391' via primers 388, 389 and 391 respectively to regulate AND gates 406, 409 and 411. Similarly, a signal indicative of stream two is tapped from primer 372 and connected to each of AND gates 393, 394, and 395, whose outputs are connected to primers 396, 397 and 398 and associated inverters 375, 377 and 378. AND gates 393, 394 and 395 are also coupled through primers 396, 397 and 398 to one input of AND gates 399, 401 and 402, respectively, whose other inputs are coupled to associated primers 371, 373 and 374 and whose outputs are applied to inverters 403', 404' and 405', via primers 403, 404 and 405 respectively, providing inputs to AND gates 392, 409 and 411. In the same manner, certain selected combinations of signals from primers 371, 372, 373 and 374, and inverters 375, 376, 377 and 378 are fed to block areas 407 and 408, representative of logic circuitry analogous to that heretofore shown within FIG. 31, to emit signals which are also coupled to the AND gates 392, 406, 409 and 411 as indicated in FIG. 31. All of these four AND gates are further fed from a signal source $T_c$, and signals indicative of the presence of $S_1$, $S_2$, $S_3$ and $S_4$ from the stream counter 76 are, respectively, fed to AND gates 392, 406, 409 and 411. As disclosed, primers 371, 372, 373, 374, 382, 383, 384, 396, 397, 398 and analogous primers within block areas 407 and 408 are all reset by signal source $T_{fd}$, whereas primers 388, 389, 391, 403, 404, 405 and analogous primers within block areas 407 and 408 are all reset by signal source $T_{cd}$.

The logic circuitry of FIG. 31 is designed to indicate at either the output of AND gate 392, 406, 409 or 411, the recognition of $S_1$ upper, $S_2$ upper, $S_3$ upper or $S_4$ upper or which stream is in fact the uppermost stream, each of the aforesaid AND gates being energized at $T_c$ time so that the relevant output signal may be sampled. The output of AND gate 392 will be down only upon coincidence of its input signals comprising of $T_c$; stream two not above stream one $(\overline{2A1})$, stream three not above stream one $(\overline{3A1})$, stream four not above stream one $(\overline{4A1})$, and $S_1$, as it is readily apparent that should stream one appear above each of streams two, three and four, it is in fact the uppermost stream. To obtain an indication of 1A2, a signal indicative of an elongated stream one pulse from primer 371 and an inverted stream two pulse $(\overline{2})$ from inverter 376 are fed to AND gate 379, and if pulse 1 appears in time before pulse 2, then AND gate 379 will be enabled at the first appearance of pulse 1 as pulse $\overline{2}$ will be positive, to activate primer 382. Therefore, upon coincidence of the output of primer 382 and pulse 2 from primer 372, AND gate 385 is enabled to activate primer 388 presenting an output 1A2, which output becomes $\overline{1A2}$ via inverter 388' and is tied to AND gate 406 via inverter 388' until $T_{cd}$ time when primer 388 is reset. Should pulse 1 appear later in time than pulse 2, gate 379 will not be activated as pulse $\overline{2}$, will not appear positive at the same period of time as pulse 1, and the output $\overline{1A2}$ will appear at the output of primer 388. In an analogous manner, signals are obtained which represent $\overline{1A3}$, $\overline{1A4}$, $\overline{2A1}$, $\overline{2A3}$, $\overline{2A4}$, $\overline{3A1}$, $\overline{3A2}$, $\overline{3A4}$, $\overline{4A1}$, $\overline{4A2}$, and $\overline{4A3}$, which signals are selectively fed to the proper AND gates 392, 406, 409 or 411, for determining an output indicative of $S_1$ upper, $S_2$ upper, $S_3$ upper and $S_4$ upper. The signals $S_{1'}$, $S_{2'}$, $S_{3'}$, and $S_{4'}$, are fed from the stream counter 76 via leads 103', 133', 136' and 120 respectively to the mutual AND gates 392, 406, 409 and 411 for validating the existence of the respective streams.

It is observed that the logic circuitry presented within FIG. 31 could be utilized by one skilled in the art to not only determine which stream is the uppermost within a character, but to determine which is the lowermost, or which is the middle stream(s), whereby the latter criteria could be adopted to recognize certain other preselected features within characters.

Figure 32:
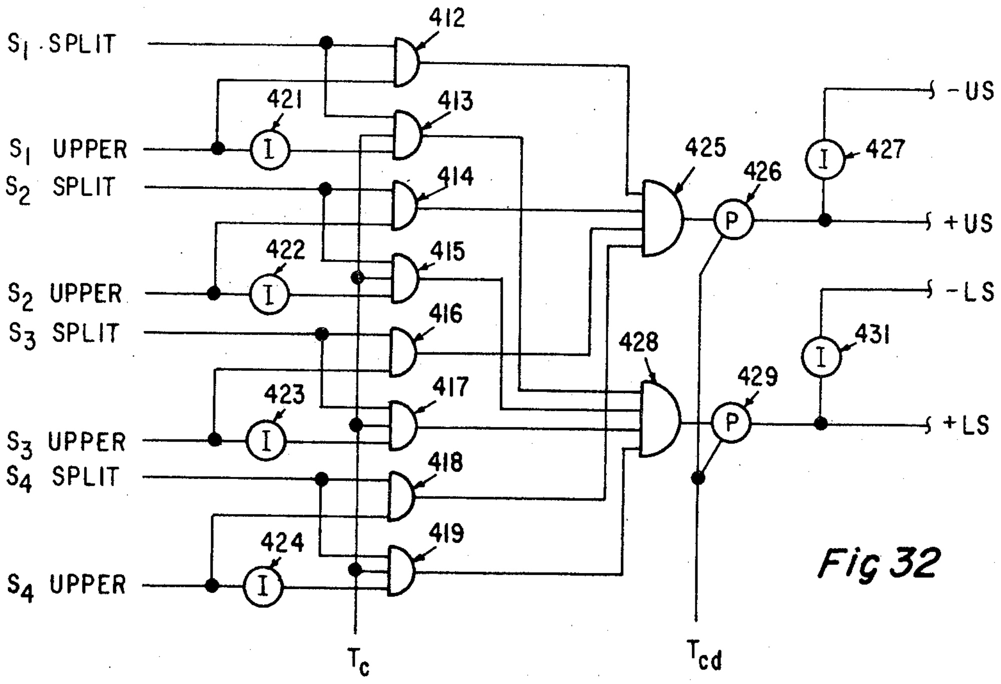
FIG. 32 illustrates a schematic diagram of upper stream and lower stream position indicator unit.

The output circuitry of AND gates 353, 354, 355 and 356 in FIG. 26, denoting that a stream split may be about to occur in any one stream, and the output circuitry of AND gates 392, 406, 409 and 411 in FIG. 31, indicating which of the streams recognized is, in fact, the upper stream within any one character, are each routed to final logic circuitry for determining whether or not an upper split and/or lower split are present within the character being scanned. The preferred embodiment of such circuitry is disclosed in FIG. 32 in schematic form, illustrating four pairs of AND gates 412 and 413, 414 and 415, 416 and 417, and 418 and 419, each of the aforesaid pairs being coupled to $S_1$, $S_2$, $S_3$ and $S_4$ split stream output indicator signals respectively, from primers 362′, 363′, 36′ and 365′ in FIG. 26. One each AND gate 412, 414, 416 and 418 of the aforesaid pairs of AND gates is further coupled to respective signals $S_1$ upper, $S_2$ upper, $S_3$ upper and $S_4$ upper, from respective AND gates 392, 406, 409 and 411 (FIG. 31). The remaining AND gates 413, 415, 417 and 419 are each coupled to sources of signals $S_1$ upper, $S_2$ upper, $S_3$ upper and $S_4$ upper, respectively, via inverter 421, 422, 423, and 424, the aforesaid AND gates additionally being connected to a pulse source $T_c$. The output of AND gates 412, 414, 416 and 418 are coupled to OR gate 425, thence to primer 426, which primer output is tapped to provide one branch coupled to an inverter 427 and similarly, the output of AND gates 413, 415, 417 and 419 are coupled to OR gate 428, thence to primer 429, which primer output is tapped to provide a branch coupled to an inverter 431.

In operation, AND gate 412 will be pulsed if there is a coincidence of a $S_1$ split pulse and a $S_1$ upper pulse to thereby indicate via OR gate 425 and primer 426 that a split has occurred within an upper stream of the character which has been scanned. However, should $S_1$ be a lower stream, $S_1$ upper will be a negative signal and via inverter 421, AND gate 413 will be enabled if an $S_1$ split is recognized by $T_c$ time to indicate through OR gate 428 and primer 429 that a split has occurred within a lower stream of the character which has been scanned. If a split should not occur in an upper stream of the character, AND gates 412, 414, 416 and 418 will not be enabled and the output of primer 426 will be down and inverted by inverter 427 denoting an absence of an upper split within the character. Similarly, if a split should not occur in a lower stream of the character, AND gates 413, 415, 417 and 419 will not be enabled and the output of primer 429 will be down and inverted by inverter 431, denoting an absence of a lower split within the character. The outputs —US, +US, —LS, and +LS, are selectively utilized as a portion of the criteria in the recognition of characters as shown in the preferred embodiment of FIGS. 15 and 46.

UJ and LJ logic

Stream joins occur as shown in FIG. 4 where two stroke portions 432 and 433 of a character as seen by a scanning line *s* are subsequently joined to become one stroke portion 434 as seen by a subsequent scanning line *t*. In order to recognize an upper join and/or a lower join, within a character, it is first necessary to determine whether a join has occurred, and to accomplish the latter function, there is disclosed in FIG. 33 in schematic form, an exemplary embodiment of the circuitry employed wherein a signal on lead 435 from delay means 58 (shown in FIG. 6) is coupled to differentiating inverter 436, similar to that disclosed in FIG. 9, thence to a primer 437, similar to that shown in FIG. 10, which primer 437 is connected to an input of AND gate 438. The signal on lead 435 is also coupled through inverter 439 to the input of AND gate 438 via differentiating inverter 441. The output of AND gate 438 is coupled to output lead 443 via primer 442 and primer 437 is connected to an output lead 444. These primers 437 and 432 are reset by a signal coupled from pulse stretcher 64 via lead 445, reset unit 446, and lead 447, which reset unit 445 is the equivalent of that disclosed and described with reference to FIG. 27.

In operation, the stream join circuitry shown in FIG. 33 will be described in conjunction with the time based wave forms disclosed in FIGS. 34 and 35. FIG. 34 portrays a time based wave form occurring during a stream join wherein the signal shown in wave form 34*a* during a prior scan from delay member 58 will be differentiated and inverted by unit 436 to form a spike (wave form 34*b*) on the trailing edge of each positive pulse. The same signal from delay member 58 through a separate path is inverted by unit 439 and then differentiated and inverted by unit 441 to form a spike (wave form 34*d*) at the leading edge of the positive pulses shown in wave form 34*a*. The signal on lead 445 from the pulse stretcher (wave form 34*e*) activates reset unit 446 to form a sharp positive spike (wave form 34*f*) having a steep slope at the trailing edge of the pulse shown in wave form 29*e*, for resetting primers 437, 442, 452, 459 and equivalent primers in the blocks 466 and 467 (to be later described), after primer 437 has been activated by the signal from differentiating inverter 436, and after primer 442 has been activated by a signal from AND gate 438 enabled by concidence of the signals shown in wave forms 34*g* and 34*d*, to thereby present on the output lead 443 of primer 442 (see wave form 34*h*) a signal denoting that a stream join has occurred.

When no stream join exists, the pulses occurring in the previous scan (wave form 35*a*) from delay unit 58 will be equal in number to those pulses (wave form 35*e*) appearing from pulse stretcher 65 and, therefore, an equal number of reset pulses produced by reset unit 446 will, in effect, cause a non-coincidence of pulses in wave forms 35*g* and 35*d* at AND gate 438, thereby preventing a positive pulse from being present at the output of primer 442 on lead 443, (see wave form 35*h*) denoting that a stream join has not occurred.

The output circuitry on lead 443 of FIG. 33 denoting whether a stream join has occurred, the output pulses on leads 444 and 447 of FIG. 33 which utilization will become apparent in the following disclosure, and the output circuitry of AND gates 392, 406, 409 and 411 in FIG. 31 indicating which of the streams recognized is, in fact, the upper stream within any one character, are each routed to final logic circuitry for determining whether or not an upper join and/or a lower join are present within the character being scanned.

Figures 33, 34, 35, 36:
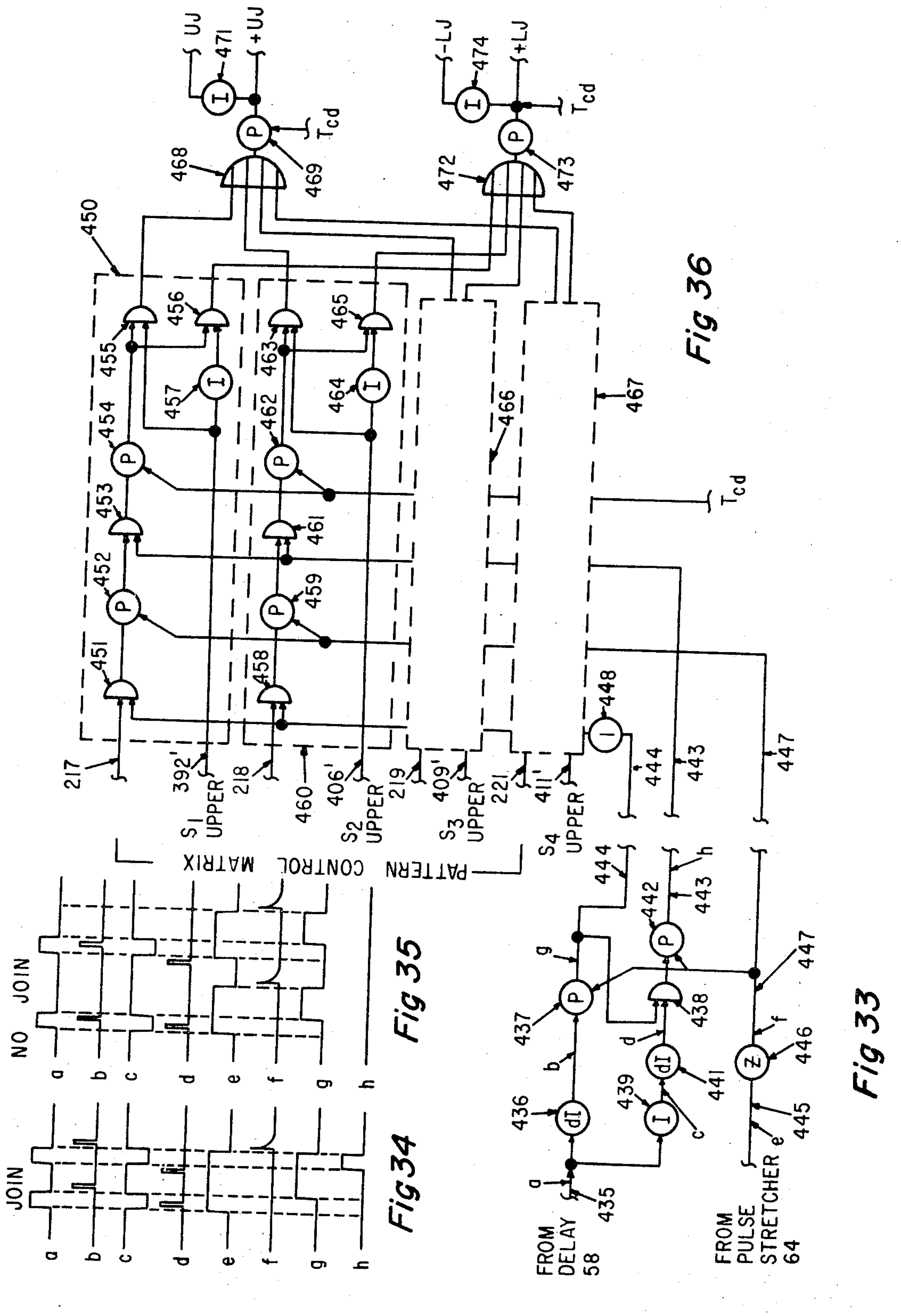
FIG. 33 is a schematic diagram of the stream join detector.
FIGS. 34 and 35 illustrate a series of time-related voltage wave forms showing time variant voltages at the corresponding points indicated in the stream join detector unit during a join and no-join respectively.
FIG. 36 is a schematic diagram of upper join and lower join register and position indicator unit.

The preferred embodiment of such circuitry is shown in schematic form in FIG. 36 wherein in block 450 there is disclosed an AND gate 451 receiving the signal on lead 217 via the pattern control matrix 197 indicating the sequential occurrence of the numbered streams from the prior scan frame and from the output lead 444 of primer 437 in FIG. 33, via inverter 448, which AND gate 451 is connected to primer 452, thence to AND gate 453, to the input of which a further signal is coupled from the lead 443 of primer 442 in FIG. 33. The output of AND gate 453 is coupled to AND gate 455 via primer 454. Primer 454 is further coupled to one input of AND gate 456 whose other input is connected to a signal $S_1$ upper at the output of AND gate 392 in FIG. 31, via an inverter stage 457. The signal $S_1$ upper is also coupled to AND gate 455. Similarly, in block 460, AND gate 458 is coupled to receive a signal on lead 218 from the pattern control matrix 197 (FIG. 3) and from lead 444. This AND gate 458 output is coupled to primer 459, thence to AND gate 461 receiving a further signal input from lead 443, AND gate 461 being connected to AND gate 463 via primer 462. Primer 462 is further connected to AND gate 465 which receives a signal $S_2$ upper from the output of AND gate 406 in FIG. 31, via an inverter stage 464, the signal $S_2$ upper also being coupled to AND gate 463. Identical circuitry to that previously described in blocks 450 or 460 is represented by each block 466 and 467, except that the input signal to the blocks are signals on lead 219 and $S_3$ upper, and signals on lead 221 and $S_4$ upper, respectively. The AND gates 455, 463 and the analogous AND gates within blocks 466 and 467 are all coupled to OR gate 468, thence to primer 469 having an output signal branch denoting a positive upper join (+UJ), and another branch including an inverter stage 471 to provide output signal denoting a negative upper join (−UJ). In the same manner the AND gates 456, 465 and the analogous AND gates within blocks 466 and 467 are all coupled to OR gate 472, thence to primer 473 having an output signal branch denoting a positive lower join (+LJ) and another branch coupled through an inverter stage 471 denoting a negative lower join (−LJ). Primers 452, 459 and analogous primers within the blocks 466 and 467 are reset by a signal on lead 447 from the reset unit 446 in FIG. 33, and primers 454, 462 and analogous primers in blocks 466 and 461 are reset by a signal from pulse source $T_c$, whereas primers 469 and 473 are reset by a signal from pulse source $T_{cd}$.

In operation, the circuitry will be explained in conjunction with the character shown in FIG. 4, where during a scan frame, two joins are recognized, AND gate 451 in block 450 will first be enabled upon coincidence of signal on lead 217, indicative of the presence of signal $S_1$, and a signal on lead 444, which is formed at the trailing edge of the first of the two pulses occurring during scan frame *s* (see wave form 34*g*), which ultimately forms the upper join, the signal on lead 444 being first inverted so as to be positive during the occurrence of the first signal on lead 217. The enabling of AND gate 451 will set off primer 452 which will enable AND gate 453 when the join signal on lead 443 is presented, thereby activating primer 454, primer 452 being reset by the signal on lead 447 (see wave form 34*f*) occurring at the end of each pulse from the pulse stretcher. In a similar manner the corresponding primer in box 467 will be activated as a join, also occurs while following stream $S_4$. Since $S_1$ is the upper stream, a positive signal will be present at $T_c$ time on lead 392′, representing $S_1$ upper, to enable AND gate 455 to pass a signal for activating primer 469 via OR gate 468 to denote the presence of an upper join within the characters. $S_4$, not being an upper stream, will present a negative signal on lead 411′ which will activate primer 473 via OR gate 472, denoting the presence of a lower join within the character. It will be noted that if AND gates 456, 465 and those analogous AND gates in blocks 466 and 567 were not enabled during time $T_c$, the output of AND gate 456 would be up after the join but prior to $T_c$, and therefore primer 473 would indicate a lower join when in fact an upper join had occurred.

UH logic

In order to ascertain whether an upper horizontal (UH) exists within a character in the preferred embodiment, it is first necessary to determine if a horizontal is present and if so, in what stream number does the horizontal appear. To perform the latter function, exemplary logic circuitry is shown in schematic form in FIG. 37 wherein in block 480, signal $S_1$ on lead 143 is provided via differentiating inverter 485 whose output is additionally connected to primer 486 and thence to AND gate 487. Signal $S_1$ on lead 143 is further coupled to inverter 488 and thence to AND gate 487 via differentiating inverter 489. AND gate 487 is connected to AND gate 484 by way of primer 491 and inverter 492, AND gate 484 is coupled to AND gate 494 via primer 493, and the AND gate 494 is connected to primer 496 by way of special measuring unit 495. Blocks 497, 498 and 499 each represent similar circuitry as that shown in block 480 except that the input signals are $S_2$, $S_3$, and $S_4$ on leads 144, 145 and 146, respectively, instead of signal $S_1$ on lead 143. Primers 482, 486, 491, 493 and analogous primers within the blocks 497, 498 and 499 are each reset by a signal source $T_{fd}$, whereas AND gate 494 and analogous AND gates within the blocks 497, 498 and 499 are coupled to a signal source $T_f$. Special measuring unit 495 and analogous special measuring units in blocks 497, 498 and 499 are all reset by a signal source $T_c$ and primer 496 and analogous primers within blocks 497, 498, 499 are reset by signal source $T_{cd}$.

Figure 37:
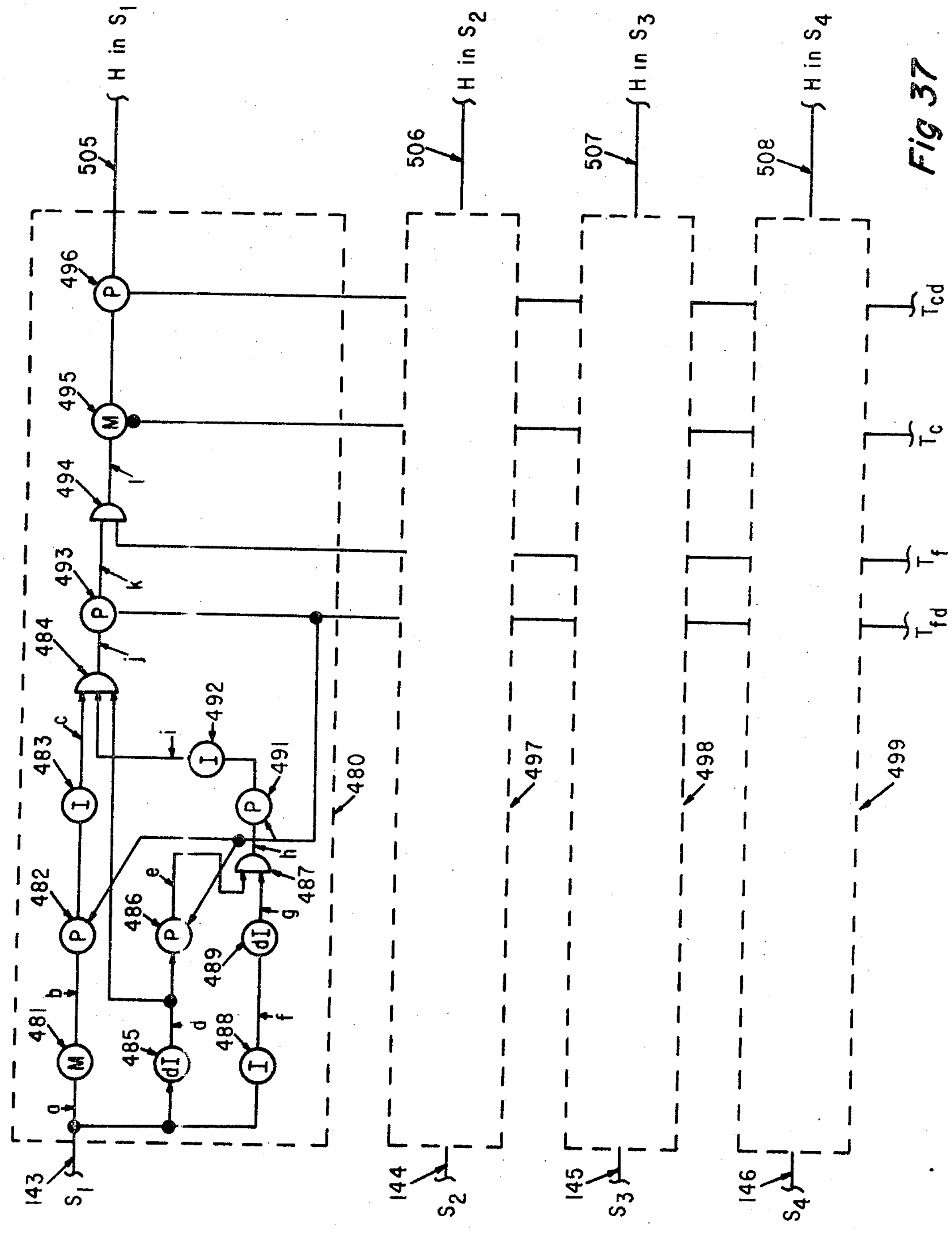
FIG. 37 is a schematic diagram of the stream horizontal detector unit.
Figure 38:
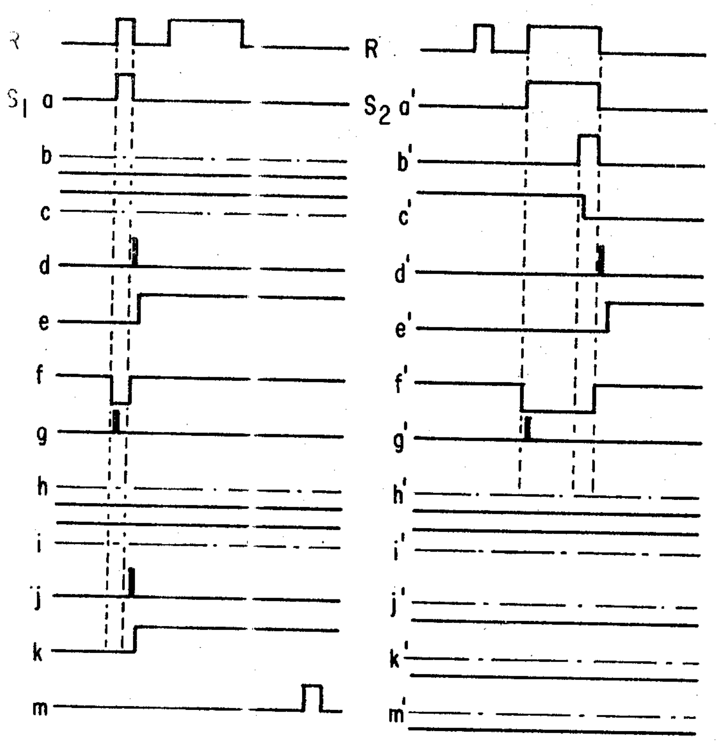
FIG. 38 illustrates a time-related voltage waveform showing time variant voltages at the corresponding joints indicated in FIG. 37.
Figure 39:
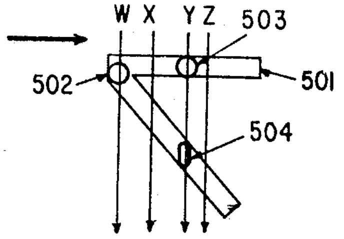
FIG. 39 is used to illustrate a character configuration and its appearance to the horizontal detector unit in FIG. 37.

In FIG. 39, there is shown a character configuration 501 being intersected by scan line *w* at point 502 and by scan line *y* at points 503, 504. Since point 502 is the first portion of the character intersected, the signal denoting the intersection will be $S_1$ and, similarly, points 503 and 504 are denoted as $S_1$ and $S_2$ respectively since they are each formed from a split of the original signal $S_1$ at point 502. Illustrative wave forms occurring in the logic circuitry of FIG. 37 are shown in FIG. 38. The time based wave form representing $S_1$ intersections during scan frame 6 of FIG. 39, shown in wave form 38*a*, is fed into the horizontal stream detector shown in FIG. 37 on lead 143. Measuring unit 481 will subtract from each of the pulses shown in wave form 38*a* that portion of a pulse equal to a time period which shall be slightly greater than the time period necessary for a vertical scan line to cross the width of a horizontal stroke portion, the resultant signal, shown in wave form 38*b*, activating primer 482 if, and only if, the pulse exceeds the time period established by measuring unit 481. The output of primer 481 is inverted by unit 483 (see wave form 38*c*). The signal $S_1$ on lead 143 is further acted on by differentiating inverter 485 presenting positive spike pulses, (wave form 38*d*) activating primer 486 for producing a signal as shown in wave form 38*e*. The signal $S_1$ on lead 143 is also inverted by unit 488 and processed by differentiating inverter 489 to produce positive spiked pulses which, when coincident with the output of primer 486, will enable AND gate 487 (see wave form 38*h*) and thence primer 491, the output of which is inverted by unit 492 (see wave form 38*i*). Upon coincidence of the signal from inverter 483, differentiating inverter 485, and inverter 492, AND gate 484 will be enabled (see wave form 38*j*), activating primer 493 whose output signal, wave form 38*k*, when present at $T_f$ time will enable AND gate 494 as shown in wave form 38*m*, primers 482, 486 and 493 all being reset at $T_{fd}$ time. The pulse shown at wave form 38*m* will be stored in special measuring unit 495, the special measuring unit to be only activated after a certain number of predetermined pulses have occurred in $S_1$, during successive scans of the character to bring the unit 495 into a state of conduction, as described with reference to FIG. 18, to activate primer 496 denoting on output lead 505, at least by $T_c$ time, that a horizontal has been recognized within the $S_1$ stream of the character (H in $S_1$). The logic circuitry represented by each of the blocks 497, 498 and 499, operates upon the input signals $S_2$, $S_3$ and $S_4$, respectively, in the same manner as described above relative to block 480, and the outputs on leads 506, 507 and 508 indicate whether or not a horizontal line has been detected within the pertinent stream being analyzed. For example, when the signal 38*a′* representing $S_2$ is fed into the logic units in block 497, a longer duration of the $S_2$ pulse is formed at intersection 504 due to the inclined angle of the stroke and the protracted period required to scan across that stroke compared with the time duration of an intersection of a horizontal stroke. The delay subtracted by the measuring unit 481 in block 497 will leave a portion of the $S_2$ stroke signal remaining to trigger primer 482 and thus through inverter 483 prevent the signal 38*d′* from passing through AND gate 484 so that primer 493 will not be turned on, and consequently no pulse will be stored in special measuring unit 495 upon occurrence of the $T_f$ sampling pulse. Thus even though stroke $S_2$ persists across the entire width of the character (no pulses will be stored to register a horizontal stream in $S_2$.

To properly follow the logic routine within the horizontal detector shown in FIG. 37, the following program table is shown wherein the functions of each of the electrical units are described along with their respective input and reset signals, if any.

PROGRAM TABLE

| Unit | Input | Reset | Signal Output Function |
|---|---|---|---|
| P482 | M481 | $T_{fd}$ | Denoting exceeding H stroke limit determined by stroke width. |
| P493 | 1,483, 1,492, 1,485 | $T_{fd}$ | Denoting first Xing not exceeding H stroke limit. |
| P496 | M495 | $T_{cd}$ | H in $S_1$. |
| P486 | 1,485 | $T_{fd}$ | Denoting end of 1st Xing in $S_1$. |
| P491 | P486, 1,486 | $T_{fd}$ | Denoting the beginning of the 2nd Xing in $S_1$. |
| M481 | $S_1$ | | Horizontal stroke limit determined by stroke width. |
| M495 | P493, $T_f$ | $T_c$ | Denoting at least a pre-determined number of horizontal Xings in $S_1$. |
| 1,483 | P482 | | Denoting H stroke limit not exceeded. |
| 1,492 | P491 | | Signal denoting that the 2nd Xing in $S_1$ has not begun. |
| 1,485 | $S_1$ | | Denoting trailing end of $S_1$, recognition pulses. |
| 1,488 | $S_1$ | | Denoting $S_1$. |
| 1,489 | 1,488 | | Denoting beginning of $S_1$ recognition pulses. |

Figure 40:
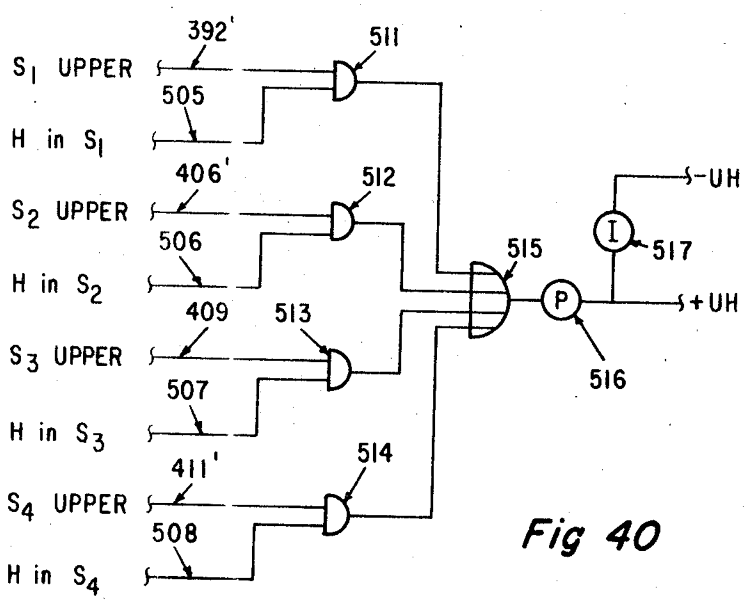
FIG. 40 is a schematic diagram of the upper stream horizontal position indicator unit.

Once it has been ascertained in which stream a horizontal line has been recognized, it is next necessary to determine whether the horizontal line occurred in an upper stream, which latter function is accomplished by the logic circuitry disclosed in FIG. 40 wherein signals $S_1$ upper, $S_2$ upper and $S_3$ upper and $S_4$ upper, respectively are connected to AND gates 511, 512, 513, and 514. Also supplied to the input of these AND gates are signals H in $S_1$, H in $S_2$, H in $S_3$ and H in $S_4$ on leads 505, 506, 507 and 508, respectively. The AND gates 511, 512, 513 and 514 are all connected to OR gate 515 and thence to primer 516, the output of primer 516 being tapped and coupled to inverter 517.

In operation, AND gates 511, 512, 513 and 514 will be enabled only upon coincidence of signals $S_1$ upper and H in $S_1$, $S_2$ upper and H in $S_2$, $S_3$ upper in H in $S_3$, and $S_4$ upper and H in $S_4$, respectively, there being only one of the signals $S_1$ upper, $S_2$ upper, $S_3$ upper or $S_4$ upper during any one character according to the embodiment heretofore described with relation to FIG. 31. Upon an enabling of one of the AND gates, the signal will pass through OR gate 515 to activate primer 51b, denoting that an upper horizontal has been recognized. However, should none of the AND gates 511, 512, 513 or 514 be enabled, the negative output of primer 516 will be inverted by unit 527 to denote that an upper horizontal is not present within the scanned character.

SAJ logic

Figure 44:
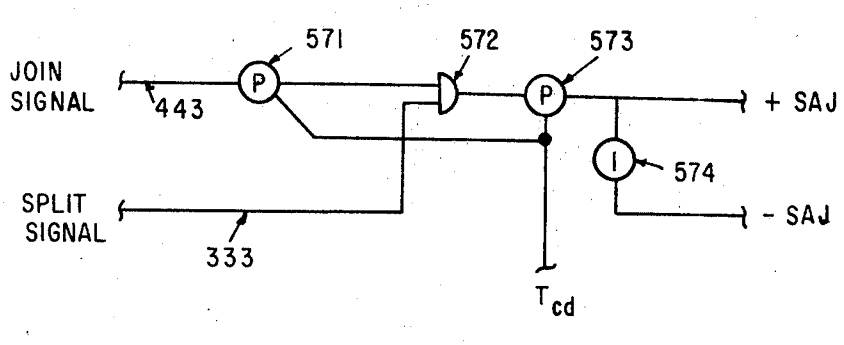
FIG. 44 is a schematic diagram of the split after join detector unit.
Figure 45:
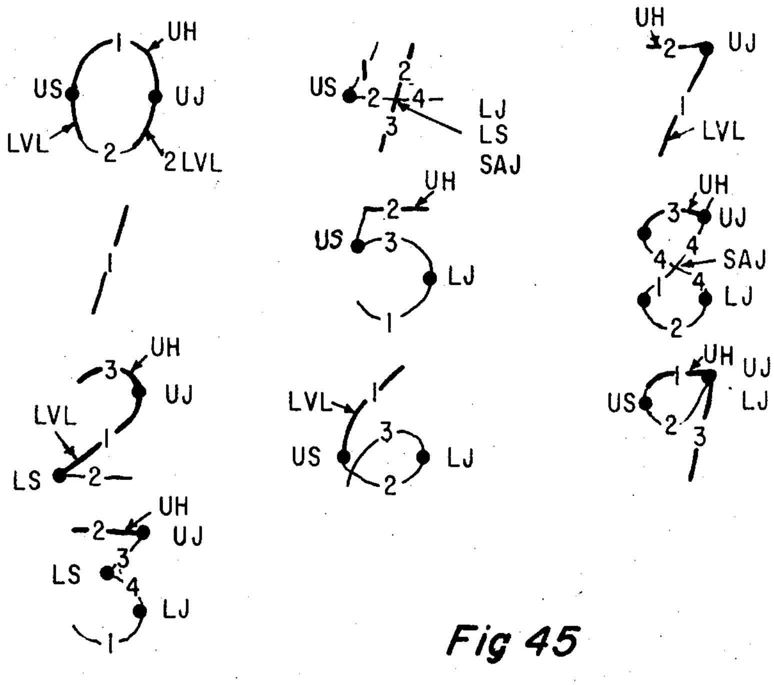
FIG. 45 is a diagram indicating typical shapes to be detected for recognition of the different numerical characters.

There is shown in FIG. 44 in schematic form an exemplary embodiment of the split after join (SAJ) feature detector, wherein a primer 571 is coupled to an input lead 443 and applies its output to one input of AND gate 572, whose other input is connected from a second input lead 333. The output of AND gate 572 is coupled to a primer 573 and thence to an inverter unit 574. Primers 571 and 573 are reset by a $T_{cd}$ pulse. In operation primer 571 is activated by a signal, from the logic circuitry shown in FIG. 33, indicative of a join recognized within the character being scanned. Should a split be recognized at any time after the join recognition, during the remainder of the frame scans within the character, AND gate 572 will be enabled to activate primer 573 denoting that a split after join (SAJ) has been seen. However, if no SAJ signal should occur, the output of inverter unit 574 will be positive to denote the absence of a SAJ.

END OF CHARACTER $T_c$ AND $T_{cd}$ RESET LOGIC

Figure 41:
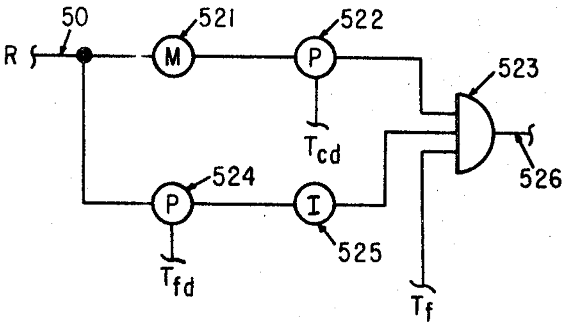
FIG. 41 is a schematic diagram of the end-of-character detector unit.

In describing the preferred embodiment of the logic in the present invention, reference has been made in numerous instances to such signals as $T_c$, $T_c$ sample and $T_{cd}$, generally for resetting or enabling the various circuit components at certain time intervals during the logic routine. It is only natural that a character be recognized upon completion of the scanning or reading operation, although it is noted that in an alternative embodiment, recognition of a certain number of selected predetermined criteria within each character may be sufficient to determine the occurrence of the end of a character for recognition purposes. In the present invention, the former method is used for determining end of character signals, an exemplary embodiment of which is illustrated in schematic form in FIG. 41 wherein the recognition signal R on lead 50 is coupled to a measuring unit 521, similar to that shown in FIG. 18, and thence to primer 522, which is reset at time $T_{cd}$, and thereafter to AND gate 523 having an output lead 526. The signal R is also connected to AND gate 523 by a separate path via primer 524, reset at time $T_{fd}$, and inverter stage 525. Another input of AND gate 523 is coupled to a signal source $T_f$. In operation the input signal R and lead 50 to the logic described in FIG. 41 will trigger measuring unit 521 only upon the attaining of a RC time value, equal to an arbitrary period selected as being the minimum signal which is definitive of a character within the complete signal being scanned, at which time primer 522 is fired to present a positive signal at AND gate 523. During a scan frame where no signal is detected primer 524 will remain unfired and therefore the inverted output of unit 525 will be positive so that at time $T_f$, AND gate 523 will be enabled to produce a pulsed signal denoting on output lead 526 that a character has been scanned and the end of the character has occurred.

Figure 42:
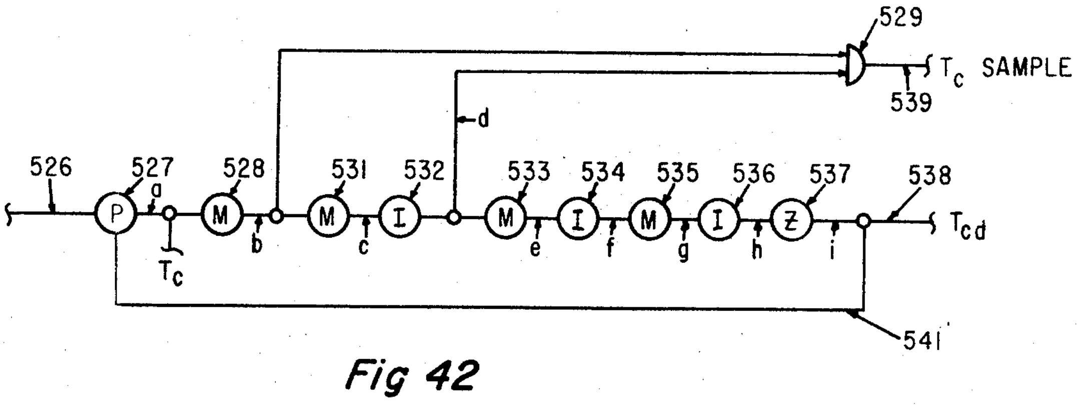
FIG. 42 is a schematic diagram of the end-of-character reset signals unit.
Figure 43:
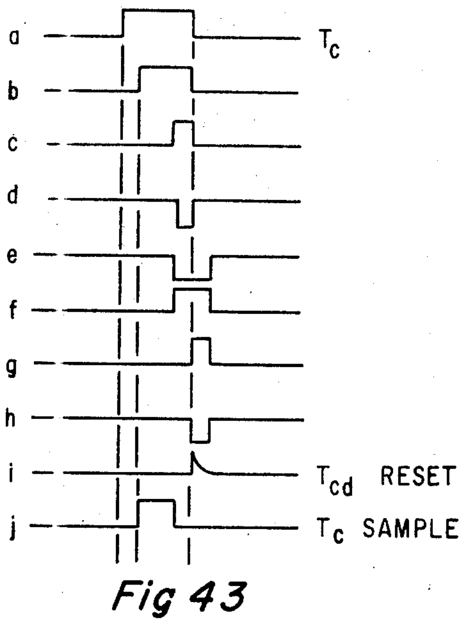
FIG. 43 illustrates a time-related voltage waveform showing time variant voltages at the corresponding points indicated in FIG. 42.

Once the end of the character being scanned is recognized, it is employed to develop three distinct signals $T_c$, $T_c$ sample and $T_{cd}$ by the logic circuitry shown in schematic form in FIG. 42 and the time based wave forms disclosed in FIG. 43, wherein the signal on lead 526 is coupled to a primer 527, thence to measuring unit 528, similar to that disclosed in FIG. 18, whose output is connected to AND gate 529 and its output lead 539. The output of measuring unit 528 is also applied to a measuring unit 531, whose output is coupled to measuring unit 533 and AND gate 529 via inverter unit 532. Measuring unit 533 is connected through inverter 534 to a measuring unit 535, which is in turn coupled to inverter 536, reset unit 537, similar to that shown in FIG. 27, and output lead 538 which is tapped to be coupled back to primer 527 via lead 541. In operation the firing of primer 527 by the signal on lead 526 initiates the end of character signal $T_c$ shown in wave form 43a, which is shortened by a preselected time period by measuring unit 528 (see wave form 43b). Measuring unit 531 further shortens the output signal of measuring unit 528 by a preselected time period (see wave form 43c) which output signal is then inverted by unit 532 as shown in wave form 43d, and then shortened by a preselected time period by measuring unit 533 (see wave form 43e) and inverted by unit 534 as shown in wave form 43f to be shortened by measuring unit 535 (see wave form 43g). This is inverted once again by unit 536 as disclosed in wave form 43h, and fed to reset unit 537 which forms a positive spiked pulse $T_{cd}$ as shown in wave form 43i at the trailing edge of the signal disclosed in wave form 43h. This $T_{cd}$ signal is employed to reset primer 527 and thus cut off and define signal $T_c$ which is the output of primer 527. The signals represented in wave forms 43b and d, when coincident, will enable AND gate 529 to form a signal $T_c$ sample (see wave form 43j) which occurs after $T_c$ commences yet ends prior to the appearance of $T_{cd}$ at the trailing edge of $T_c$. These signals are applied for resetting and enabling various units at the time occurring when the end of the character has been scanned for recognition of the character and to condition the system for recognition of the succeeding character to be scanned.

A ALTERNATE EMBODIMENT

It will be observed that in the preferred embodiment heretofore disclosed a single delay apparatus 58 was employed, as shown in FIG. 3, for all of the streams intersected by the scanning apparatus. As a substitute for the latter, separate delay apparatus could be employed for each separate stream, the streams being assigned to the delay apparatus as they occur and then allowing each delay apparatus to select the new information to be entered into itself for comparing the past and present streams so that the streams may be followed.

It is again noted that the utilization of a stream following system such as that heretofore disclosed is substantially independent of character type font and is additionally capable of identifying handwritten characters which type font and characters may widely differ in size, substantially in design and in form, so long as certain basic intracharacter relationships may be ascertained by scanning apparatus.

In essence by comparing signal events during past scanning frames with those signals events occurring during successive scanning frames the various streams or strokes of intelligence-bearing items may be logically followed to detect the presence and/or absence of preselected intracharacter patterns, to recognize and present the recognition decision to an output device for recording and reproducing the intelligence-bearing item recognized.

The wave forms illustrated in the accompanying drawings contain pulses which in many instances are delayed by such small time intervals with respect to the pulses or signals which initiate them that the time delay would be imperceptible in the time scale used in the drawings, such as, for example, the small delay relationship between the leading edges of the pulses or rises in voltage level at the primer outputs and the R pulses which trigger the primers. In such cases, the time delay in such wave forms has been somewhat exaggerated to facilitate observation of this condition.

It should be understood, of course, that the foregoing disclosure relates to only a preferred embodiment of the invention and that numerous modifications or alterations may be made therein without departing from the spirit and the scope of the invention, it is desired, therefore, that only such limitations be placed on the invention as are imposed by the prior art and as set forth in the appended claims:

What is claimed is:

1. Apparatus for reading intelligence-bearing characters comprising means for scanning the area of a character along a plurality of successive scan lines progressing in parallelism along the character area and recurring at a selected repetition rate, means for sensing the interception of each scan line by the character during the scan line and producing interception and non-interception scan signals, respectively, denoting the interception and non-interception of the scan line by a portion of the character, means for recording the scan signals produced during each scan line, delay means for delaying the scan signals for a period corresponding approximately to said repetition rate, signal stretching means for stretching the time duration of said scan signals, means for comparing on a time basis delayed and stretched representations of scan signals recorded during a prior scan with scan signals produced during successive scan lines and by such comparisons continuously following through successive scan lines character configuration streams in a character being scanned from the first portions to the last portions of such streams encountered by the scan lines, counter means for identifying each stream of a character to be read, means for maintaining the identification matched to the respective stream throughout the scanning of a character comprising, pattern record apparatus for recording the sequence of scan interceptions of a continuous stream occurring during past and successive scan lines and new streams occurring only during the successive scan line, stream switching apparatus, pattern control apparatus employing the recorded information from the pattern record apparatus for controlling the stream switching apparatus to regulate the actual orderly output of the pre-identified streams as they are intercepted during each successive scan line, said stream switching apparatus routing the outputs of the counter means and the means for comparing to detect preselected intracharacter patterns, and means for recognizing the character to be identified according to said patterns and providing an output signal indicative of the character recognized.

2. The combination recited in claim 1, wherein the means for detecting preselected intracharacter patterns comprises means for detecting the relative vertical positioning of certain preselected intracharacter patterns within the character.

3. The combination recited in claim 1, wherein the means for detecting preselected intracharacter patterns comprises means for detecting stream splits and means for detecting stream joins.

4. The combination recited in claim 1, wherein the means for detecting preselected intracharacter patterns comprises means for determining preselected lengths of character streams lying within certain preselected angular limits for detecting horizontal stream patterns.

5. The combination recited in claim 1, wherein the means for detecting preselected intracharacter patterns comprises means for determining preselected lengths of character streams lying within certain preselected angular limits for detecting vertical stream patterns.

6. Apparatus for reading intelligence-bearing characters comprising means for scanning the area of a character along a plurality of successive scan lines;

means for sensing the interception of each scan line by the character during the scan line and producing interception scan signals denoting the interception of the scan line by a portion of the character;

means for recording the scan signals produced during each scan line;

means for comparing on a time basis scan signals recorded during a prior scan with scan signals produced during successive scan lines and by such comparisons continuously following, through successive scan lines, character configuration streams in a character being scanned from the first portions of such streams encountered by the scan lines to the last portions of such streams;

stream counting means responsive to said interception scan signals for identifying the order of occurrence of each of said streams as it occurs within the character, where the first stream identified is $S_1$, the second stream is $S_2$, and the $n$th stream is $S_n$;

pattern record means responsive to said stream counting means for indicating the order of occurrence of the streams $S_1, S_2 \ldots S_n$ within each scan line;

pattern control means responsive to said pattern record means for sequentially developing $n$ control signals over $n$ of $m$ control lines, the order of actuation of said $n$ control lines corresponding to the order of occurrence of said streams $S_1, S_2 \ldots S_n$ within each said scan line;

stream switching means responsive to said comparing means and said $m$ control lines, said stream switching means having m output lines $\mathbf{1}_1, \mathbf{1}_2 \ldots \mathbf{1}_m$ and respectively switching streams $S_1, S_2 \ldots S_n$ from said comparing means over the first $n$ of said $m$ output lines, the order of switching depending on the order of actuation of said $n$ control lines;

whereby for a given scan line $S_1$ would be switched over $\mathbf{1}_1$, $S_2$ would be switched over $\mathbf{1}_2$, and $S_3$ would be switched over $\mathbf{1}_3$ even if the order of occurrence of the streams for the given scan line were $S_1, S_3, S_2$; and means responsive to said stream switching means for detecting preselected intracharacter patterns within said intelligence-bearing characters.

7. The combination recited in claim 6, wherein the means for detecting preselected intracharacter patterns comprises means for detecting the relative vertical positioning of certain preselected intracharacter patterns within the character.

8. The combination recited in claim 6, wherein the means for detecting preselected intracharacter patterns comprises means for detecting stream splits and means for detecting stream joins.

9. The combination recited in claim 6, wherein the means for detecting preselected intracharacter patterns comprises means for determining preselected lengths of character streams lying within certain preselected angular limits for detecting horizontal stream patterns.

10. The combination recited in claim 6, wherein the means for detecting preselected intracharacter patterns comprises means for determining preselected lengths of character streams lying within certain preselected angular limits for detecting vertical stream patterns.

References Cited

UNITED STATES PATENTS

| | | | |
|---|---|---|---|
| 2,338,602 | 6/1958 | Lprick | 340—146.3 |
| 2,889,535 | 6/1959 | Rochester | 340—146.3 |
| 2,956,264 | 10/1960 | Rohland | 340—146.3 |
| 2,959,769 | 11/1960 | Greanias | 340—146.3 |
| 3,142,818 | 7/1964 | Holt | 340—146.3 |

MAYNARD R. WILBUR, Primary Examiner